United States Patent
Harada

(10) Patent No.: US 9,062,599 B2
(45) Date of Patent: Jun. 23, 2015

(54) CRANKSHAFT SUPPORT STRUCTURE IN INTERNAL COMBUSTION ENGINE

(75) Inventor: Makoto Harada, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 13/812,334

(22) PCT Filed: Jul. 12, 2011

(86) PCT No.: PCT/JP2011/065880
§ 371 (c)(1),
(2), (4) Date: Jan. 25, 2013

(87) PCT Pub. No.: WO2012/017784
PCT Pub. Date: Feb. 9, 2012

(65) Prior Publication Data
US 2013/0118444 A1    May 16, 2013

(30) Foreign Application Priority Data

Aug. 4, 2010  (JP) .................. 2010-175688

(51) Int. Cl.
*F02B 75/32*   (2006.01)
*F16C 17/10*   (2006.01)
(Continued)

(52) U.S. Cl.
CPC . *F02B 77/00* (2013.01); *F16C 9/04* (2013.01); *F16C 9/02* (2013.01); *F16C 35/02* (2013.01); *F16C 19/46* (2013.01)

(58) Field of Classification Search
CPC .......... F02B 67/06; F02B 75/22; F02B 67/04; F02B 75/32; F02B 41/04; F02B 2075/025; F02B 9/047; F16C 7/023; F16C 9/04; F16C 33/1075; F16C 33/1065; F16C 9/02; F16C 17/02

USPC .................. 123/198 R, 197.4, 197.1, 197.3; 384/288

See application file for complete search history.

(56) References Cited

U.S. PATENT DOCUMENTS 3,249,391 A * 5/1966 De Hart et al. ............... 384/294
6,497,211 B2 * 12/2002 Nomura et al. ........... 123/195 R
(Continued)

FOREIGN PATENT DOCUMENTS

EP   1 627 995 A2   2/2006
JP   2000-161333 A  6/2000
(Continued)

OTHER PUBLICATIONS

Japanese Office Action issued on Mar. 11, 2014 on the corresponding JP Patent Application 2010-175688 with the English translation thereof.
(Continued)

*Primary Examiner* — Lindsay Low
*Assistant Examiner* — Syed O Hasan
(74) *Attorney, Agent, or Firm* — Carrier Blackman & Associates, P.C.; Joseph P. Carrier; Anne G. Sabourin

(57) ABSTRACT

In a crankshaft support structure of an internal combustion engine, an oil pump can be miniaturized with miniaturizing the internal combustion engine by using a slide bearing. In the support structure for the crankshaft supported by right-left split crankcases 25 which are joined from both the sides in the axial direction of the crankshaft 41 so as to sandwich the crankshaft 41 therebetween, slide bearings 111 are applied to both crank bearings for supporting both the ends of the crankshaft 41, and a roller bearing 112 is applied to a bearing for a big end portion 42.

15 Claims, 12 Drawing Sheets

(51) Int. Cl.
  *F02B 67/06* (2006.01)
  *F02B 77/00* (2006.01)
  *F16C 9/02* (2006.01)
  *F16C 35/02* (2006.01)
  *F16C 19/46* (2006.01)
  *F16C 9/04* (2006.01)

(56) References Cited

U.S. PATENT DOCUMENTS

| | | | |
|---|---|---|---|
| 6,530,353 B2 * | 3/2003 | Ito et al. | 123/195 R |
| 6,672,271 B2 * | 1/2004 | Nomura et al. | 123/195 R |
| 7,143,735 B2 * | 12/2006 | Takahashi et al. | 123/195 H |
| 7,201,686 B2 * | 4/2007 | Masuda et al. | 474/144 |
| 2004/0168657 A1 * | 9/2004 | Gooijer | 123/78 F |
| 2008/0202483 A1 | 8/2008 | Procknow | |
| 2010/0162973 A1 | 7/2010 | Takano | |
| 2011/0232592 A1 | 9/2011 | Taki et al. | |

FOREIGN PATENT DOCUMENTS

| | | |
|---|---|---|
| JP | 2003-184648 A | 7/2003 |
| JP | 2003-239938 A | 8/2003 |
| JP | 2007-224860 A | 9/2007 |

OTHER PUBLICATIONS

Supplementary European Search Report issued on Jan. 14, 2014 on the corresponding EP patent application 11 814 414.6.
European Office Action issued on Jan. 27, 2014 on the corresponding EP patent application 11 814 414.6.
JP Office Action issued in corresponding JP patent application Aug. 20, 2013 and English translation thereof.

* cited by examiner

CRANKSHAFT SUPPORT STRUCTURE IN INTERNAL COMBUSTION ENGINE

TECHNICAL FIELD

The present invention relates to a crankshaft support structure in an internal combustion engine.

BACKGROUND ART

There has been hitherto known a crankshaft support structure in an internal combustion engine in which a bearing portion of a crankshaft is supported by a metal bearing (slide bearing) which is advantageous to miniaturization of the internal combustion engine (see Patent Document 1, for example).

PRIOR ART DOCUMENT

Patent Document

Patent Document 1: JP-A-2007-224860

SUMMARY OF THE INVENTION

Problem to be Solved by the Invention

However, it is required to stably supply lubricant oil to the metal bearing. Therefore, there is a problem that an oil pump for supplying lubricant is large in size when the whole bearing portion of the crankshaft is designed as a slide bearing.

The present invention has been implemented in view of the foregoing situation, and has an object to miniaturize the oil pump with miniaturizing an internal combustion engine by using a slide bearing in a crankshaft support structure in the internal combustion engine.

Means of Solving the Problem

In order to attain the above object, according to the present invention, a support structure for a crankshaft supported by right-left split crankcases (25) that are joined from both sides in an axial direction of a crankshaft (41) so as to sandwich the crankshaft (41) therebetween, is characterized in that both crank bearings for supporting both ends of the crankshaft (41) comprise slide bearings (111), and a bearing for a con-rod big end (42A) comprises a roller bearing (112). According to this construction, the slide bearings are applied to both the crank bearings for supporting both the ends of the crankshaft, and the roller bearing is applied to the bearing for the big end of the connecting rod. Therefore, the oil supply amount of the roller bearing of the con-rod big end can be reduced. Therefore, the required oil supply amount can be reduced with miniaturizing both the crank bearings by using the slide bearings as the crank bearings, and the oil pump can be miniaturized.

In the above construction, the slide bearings (111) may be bisectionally constructed, split faces (145) passing through a crank axis line (G) and both side surfaces (146A, 146B) in an axial direction of the slide bearings (111) may be configured to be flat, and a bush (130) having higher rigidity than the material of the crankcase (25) may be disposed in a bearing press-fit hole (110) of the crankcase (25).

In this case, the split faces and both the side surfaces in the axial direction of the slide bearings are configured to be flat, the areas of the press face and the mating face when the slide bearings are pressed into the bearing press-fit holes are secured, so that the assembling workability can be enhanced. Furthermore, the bush having the higher rigidity than the material of the crankcase is disposed in the bearing press-fit hole. Therefore, an interference for press-fit can be made high, and the slide bearings can be more surely fixed.

Furthermore, the crankshaft (41) may be an assembling type crankshaft in which both end portions thereof are manufactured while separated from a crankpin portion (103), bearing portions (104A, 104B) at both the ends of the crankshaft that are supported by the slide bearings (111) may be formed to be larger in diameter than both the sides thereof, and super finishing may be conducted on surfaces of the bearing portions (104A, 104B) before the crankshaft (41) is assembled.

In this case, the super finishing for the surfaces of the bearing portions at both the ends which are supported by the slide bearings is performed before the assembly type crankshaft is performed. Therefore, it is unnecessary to perform the super finishing on a relatively large crankshaft which has been already assembled, so that the facilities for the processing can be miniaturized, and the productivity can be enhanced.

Furthermore, the inner periphery (131) of the bush (130) may be configured to have a flat shape having no groove, the center portion in the width direction of the outer periphery (132) may be configured as a ring-shaped diameter-increased portion (132A), and the whirl-stop portions (132B) discontinuous in the peripheral direction may be provided at both the side portions.

In this case, the inner periphery of the bush is configured to have a flat shape having no groove, and the center portion in the width direction of the outer periphery is configured as a ring-shaped diameter-increased portion. Therefore, the rigidity of the bush can be enhanced, and the thermal expansion of the bush can be made uniform, so that the joint strength to the crankcase can be enhanced. Furthermore, the joint strength to the crankcase can be enhanced by the whir-stop portions.

Furthermore, an oil pump (86) may be disposed to be shifted to one side in the axial direction of the crankshaft (41), one oil may be introduced from the oil pump (86) through a crankshaft end (108) to the con-rod big end (42A) by an oil path (113) penetrating through the shaft, and the other oil may be introduced from support member (23A) sides of the crankcases (25) to the slide bearings (111). In this case, one oil introduced to the con-rod big end is passed via the crankshaft end through the oil path penetrating in the shaft separately from the other oil introduced from the support member side of the crankcase to the slide bearings, so that the oil supply amount of this oil path can be reduced to the oil supply amount optimum to the roller bearing of the con-rod big end. Accordingly, the roller bearing of the con-rod big end can be prevented from being excessively supplied with oil, and thus friction can be reduced.

Furthermore, the one oil path (113) may be a path which is branched from an oil supply path (95A) to a valve driving system by providing a diaphragm portion (96A).

In this case, the one oil path is the path which is branched from the oil supply path to the valve driving system by providing the diaphragm portion. Therefore, the oil supply amount to the con-rod big end side can be reduced with a simple construction while the oil supply amounts to the slide bearing and the valve driving system in which the other oil flows are secured. Furthermore, since the oil supply amount can be reduced, the oil pump can be miniaturized.

Furthermore, the oil supply to the slide bearings (111) may be performed through a through-hole (135) in a radial direction that is formed in the bush (130) so as to be coaxial with paths (99, 99) in the crankcase.

In this case, the oil supply to the slide bearing is performed through the penetration hole in the radial direction which is formed in the bush coaxially with the path in the crankcase. Therefore, the work of coaxially matching the path in the crankcase and the through-hole of the bush with each other can be eliminated, and the productivity can be enhanced.

Furthermore, a holding wall (23A) of the crankcase (25) for holding the bush (130) may have large-width covering portions (128A, 128B) for covering both side surface portions (133A, 133B) of the bush, and a bush support portion (137) that is larger in width than a peripheral wall (120) of the crankcase (25) and smaller in width than the large-width cover portions (128A, 128B) at an outer peripheral surface side of the bush (130), and the bush support portion (137) may be configured to have a thickness that is not less than the thickness of the bush (130). In this case, the bush is supported by the bush support portion which is larger in width than the peripheral wall and has a thickness which is not less than the thickness of the bush. Therefore, the bush can be stably supported, and the thermal effect and the distortion effect which the bush suffers from the peripheral wall can be dispersed and moderated.

Still furthermore, an oil pool wall (139) may be formed at a side portion at a con-rod counter side of the large-width cover portions (128A, 128B) by further extending a cover portion (128A) for covering a side surface (133A) of the bush (130) to the inner peripheral side, and a thrust receiver (147) of the crankshaft (41) may be formed at a side portion at the con-rod (42) side of the large-width cover portions (128A, 128B).

In this case, when the thrust receiver of the crankshaft which is formed at the side portion of the con-rod side of the large-width cover portion is lubricated with oil leaking from the slide bearing, the amount of oil leaking to the outside of the oil can be restricted by the oil pool wall of the cover portion at the con-rod counter side, so that the oil amount can be set to a proper value and the lubrication can be efficiently performed.

Effect of the Invention

In the support structure for the crankshaft according to the present invention, both the ends of the crankshaft are supported by the slide bearings, and the con-rod big end is supported by the roller bearing, so that the oil supply amount can be reduced in the roller bearing of the con-rod big end. Therefore, the required oil supply amount can be reduced with attempting miniaturization by the slide bearings, so that the oil pump can be miniaturized.

Furthermore, the split faces and both the side surfaces of the slide bearing are configured to be flat, and the areas of the press face and the mating face when the slide bearing is pressed in are secured. Therefore, the assembling workability can be enhanced. Furthermore, the bush whose rigidity is higher than the material of the crankcase is disposed in the bearing press-fit hole, so that the interference for press-fit can be increased, and the slide bearing can be more surely fixed.

Furthermore, the super finishing on the surface of the bearing portion of the crankshaft is performed before the crankshaft is assembled. Therefore, it is unnecessary to perform the super finishing on the crankshaft after the assembling work. Therefore, the facilities for the processing can be miniaturized, and the productivity can be enhanced.

Still furthermore, the inner periphery of the bush has a flat shape having no groove, and the center portion in the width direction of the outer periphery is configured as a ring-shaped diameter-increased portion. Therefore, the rigidity of the bush can be enhanced, the thermal expansion of the bush can be made uniform and the joint strength to the crankcase can be enhanced. Furthermore, the joint strength to the crankcase can be enhanced by the whirl-stop portions.

Still furthermore, the one oil introduced to the con-rod big end passes through an oil path different from an oil path through which the other oil is introduced to the slide bearings. Therefore, the oil supply amount of this oil path can be reduced to the oil supply amount optimum to the roller bearing of the con-rod big end. Accordingly, the roller bearing of the con-rod big end can be prevented from being excessively supplied with oil, and thus friction can be reduced.

Furthermore, the one oil path is a path branched from the oil supply path to the valve driving system by providing the diaphragm portion. Therefore, the oil supply amount to the con-rod big end side can be reduced with a simple construction with securing the oil supply amount of the other oil. Still furthermore, since the oil supply amount can be reduced, the oil pump can be miniaturized.

The work of coaxially matching the path in the crankcase and the through-hole of the bush can be eliminated by the coaxial processing, and the productivity can be enhanced. Furthermore, the bush is supported by the bush support portion which is larger in width than the peripheral wall and whose thickness is not less than the thickness of the bush. Therefore, the bush can be stably supported, and the thermal effect and the distortion effect which the bush suffers from the peripheral wall can be dispersed and moderated. Still furthermore, when the thrust receiver of the crankshaft is lubricated with oil leaking from the slide bearings, the amount of oil leaking to the outside can be restricted by the oil pool wall of the cover portion at the con-rod counter side, and thus the oil amount can be made proper and the lubrication can be efficiently performed.

BEST MODE FOR CARRYING OUT THE INVENTION

A two-wheeled motor vehicle according to an embodiment of the present invention will be described with reference to the drawings. In the following description, the up-and-down, front-and-rear and right-and-left directions are defined as being viewed from the driver's side on a vehicle.

Figure 1:
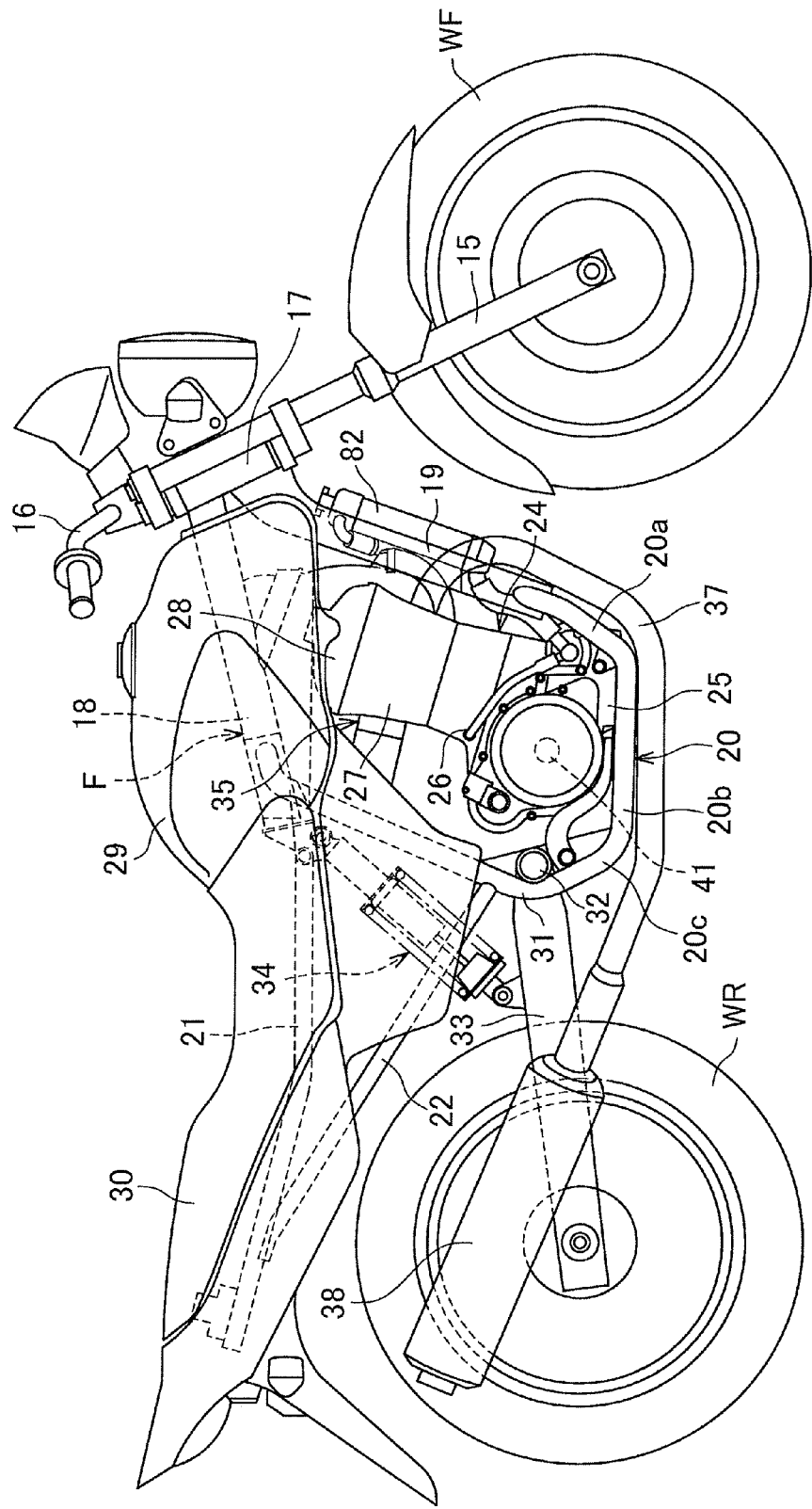
FIG. 1 is a right side view showing a two-wheeled motor vehicle according to an embodiment of the present invention.

FIG. 1 is a right side view showing a two-wheeled motor vehicle according to an embodiment of the present invention.

A vehicle body frame F of the two-wheeled motor vehicle has a head pipe 17 provided to the front portion of the vehicle body, a main frame 18 extending rearwards and downwards from the head pipe 17, a down frame 19 which is connected to the head pipe 17 at the lower side of the main frame 18 and extends rearwards and downwards at a steeper angle than the main frame 18, a pair of right and left lower frames 20 through which both the right and left sides of the rear portion of the main frame 18 and both the right and left sides of the lower end portion of the down frame 19 are connected to one another, a pair of right and left seat rails 21 which are connected to the rear portion of the main frame 18 and extend rearwards, and a pair of right and left rear frames 22 through which the lower frames 20 and the rear portions of the seat rails 21 are connected to one another.

Furthermore, a pair of right and left front forks 15 for pivotally supporting a front wheel WF is supported by the head pipe 17, and a handle 16 for steering is provided to the upper end portion of the front fork 15.

The lower frame 20 is integrally provided with a first frame portion 20a suspended from the lower portion of the down frame 19, a second frame portion 20b extending substantially horizontally rearwards from the first frame portion 20a and a third frame portion 20c extending upwards from the rear end of the second frame portion 20b. The lower frame 20 is designed in a substantially U-shape opened upwards in side view, and the upper end of the third frame portion 20c is connected to the rear end portion of the main frame 18.

An engine 24 of the vehicle is mounted on the vehicle body frame F so as to be surrounded by the main frame 18, the down frame 19 and the lower frame 20. The engine 24 is a water-cooled type four-cycle single cylinder engine, and has a crankcase 25, a cylinder block 26 which is joined to the front-side upper portion of the crankcase 25 so as to erect upwards while tilting frontwards, a cylinder head 27 joined to the upper end of the cylinder block 25 and a head cover 28 joined to the upper end of the cylinder head 27.

An exhaust pipe 37 is connected to the front portion of the cylinder head 27, and the exhaust pipe 37 extends downwards, passes over the lower side of the engine 24 while extending rearwards and then is connected to a muffler 38 disposed at the right side of the rear wheel WR.

An air-intake device 35 for supplying air to the engine 24 is connected to the rear portion of the cylinder head 27.

A radiator 82 in which cooling water for the engine 24 is circulated is provided to the front side of the engine 24, and the radiator 82 is supported by the down frame 19.

Furthermore, a fuel tank 29 is mounted on the main frame 18 at the upper side of the engine 24, and a seat 30 for passengers which is supported by the seat rails 21 is disposed at the rear side of the fuel tank 29.

A pair of right and left pivot plates 31 are provided to the lower frames 20 so as to stride over the second and third frame portions 20b, 20c, and swing arms 32 are swingably supported on the pivot plates 31 through a pivot shaft 32. The rear wheel WR is pivotally supported by the rear ends of the swing arms 33, and driven by a driving chain 14 (see FIG. 3) which is wound around a counter shaft 66 (see FIG. 2) of the engine 24 and he rear wheel WR. A rear cushion 34 is provided between the vehicle body frame F and the swing arm 33 so as to be freely capable of expansion and contraction.

Figure 2:
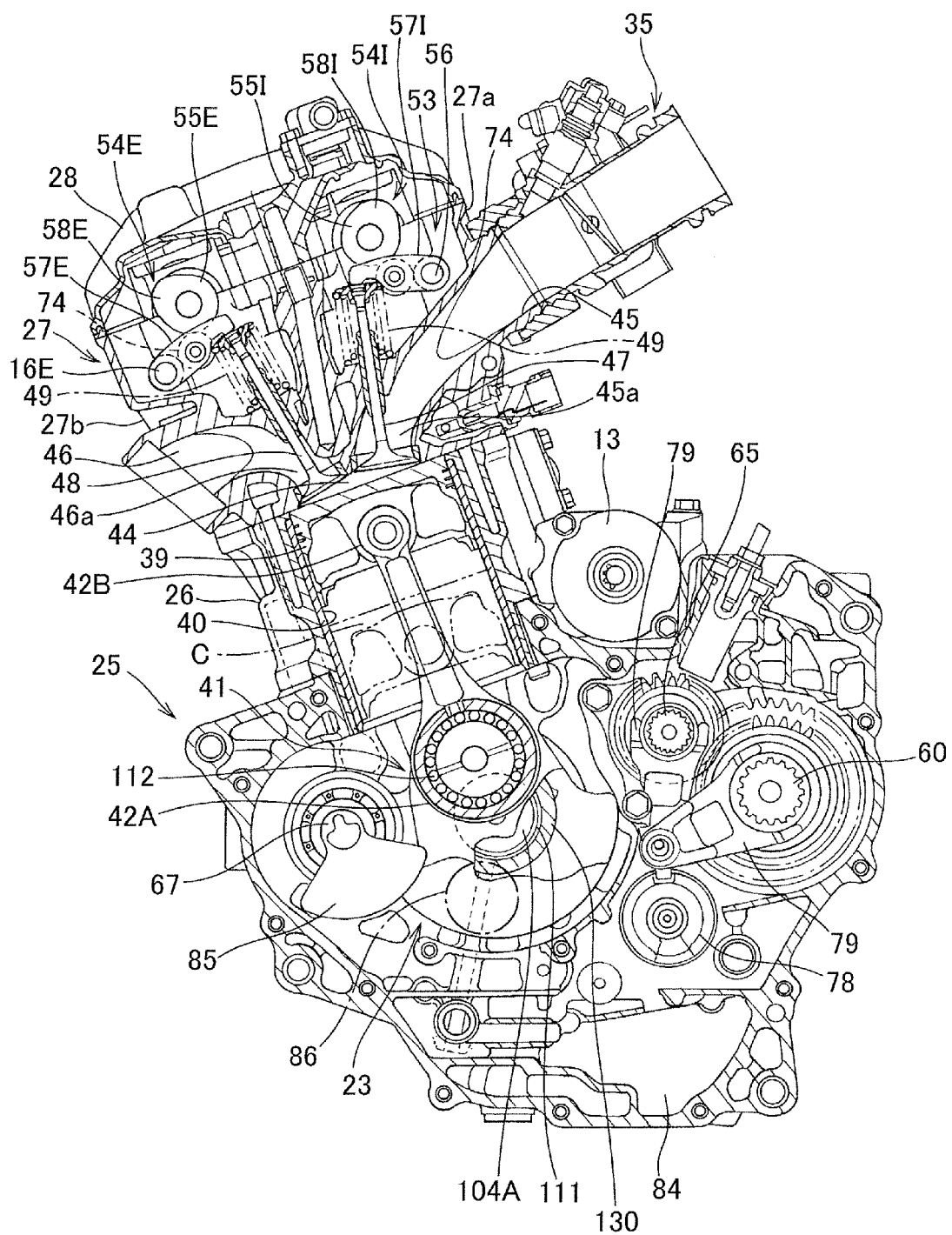
FIG. 2 is a partially exploded side view of an engine when the engine is viewed from the left side of a vehicle.

FIG. 2 is a partially exploded side taken when the engine 24 is viewed from the left side of the vehicle.

As shown in FIG. 2, a crankshaft 41 having an axis line G (crank axis line) (see FIG. 3) extending horizontally in the vehicle width direction of the two-wheeled motor vehicle is disposed in the crankcase 25.

A main shaft 65, a counter shaft 66 and a balancer shaft 67 which are disposed in parallel to the crankshaft 41 are provided in the crankcase 25. These shafts 65, 66 containing the crankshaft 41 constitute a gear transmission mechanism for successively transmitting the rotation of the crankshaft 41 to the main shaft 65 and the counter shaft 66 in this order. A shift drum 78 and a shift fork 79 for performing transmission operation are provided at the lower side of the main shaft 65.

The cylinder block 26 joined to the upper portion of the crankcase 25 has a cylinder bore 40 in which a piston 39 is freely slidably fitted, and disposed so that a cylinder shaft axis C as the axis line of cylinder bore 40 leans forward with respect to the vertical direction. The crankshaft 41 is freely rotatably supported in the crankcase 25, and the piston 39 is connected to the crankshaft 41 through a connecting rod 42. The crankshaft 41 is accommodated in a crank chamber 23 below the cylinder bore 40.

A combustion chamber 44 is formed between the cylinder block 26 and the cylinder head 27 so as to face the apex portion of the piston 39, and the cylinder head 27 is provided with an air-intake port 45 opened in the rear side wall 27a thereof and an exhaust port 46 opened in the front side wall 27b thereof.

An ignition plug 51 (see FIG. 3) is secured to the cylinder head 27 so as to face the center of the combustion chamber 44.

Furthermore, an intake device 35 intercommunicating with the intake port 45 is connected to the rear side wall 27a of the cylinder head 27, and an exhaust pipe 37 (see FIG. 1) intercommunicating with the exhaust port 46 is connected to the front side wall 27b.

The air-intake port 45 is bifurcated in the vehicle width direction so as to have a pair of branch paths 45a (the branch path at the right surface side is not shown), and the exhaust port 46 is bifurcated in the vehicle width direction so as to have a pair of branch paths 46a (the branch path at the right surface side is not shown). A pair of air-intake valves 47 for switching intercommunication and interception between each branch path 45a and the combustion chamber 44 are disposed in the branch paths 45a, a pair of exhaust valves 48 for switching intercommunication and interception between each branch path 46a and the combustion chamber 44 are disposed in the branch paths 46a, and the air-intake valves 47 and the exhaust valves 48 are provided so as to be openable/closable.

Each air-intake valve 47 is urged in a valve closing direction by a valve spring 49 provided between the air-intake valve 47 and the cylinder head 27, and each exhaust valve 48 is urged in a valve closing direction by a valve spring 49 provided between the exhaust valve 48 and the cylinder head 27.

The cylinder head 27 has an accommodation portion concaved to the combustion chamber 44 side above the air-intake port 45 and the exhaust port 46, and the accommodation portion is blocked by the head cover 28, whereby a valve driving chamber 53 is formed at the upper portion of the cylinder head 27. An air-intake side valve driving device 54I for performing the opening and closing operation of the pair of air-intake valves 47, and an exhaust side valve driving device 54E for performing the opening and closing operation of the pair of exhaust valves 48 are accommodated in the valve driving chamber 53. The air-intake side valve driving device 54I and the exhaust side valve driving device 54E are overhead valve type valve driving devices having the air-intake valves 47 and the exhaust valves 48 above the combustion chamber 44. The air-intake side valve driving device 54I and the exhaust side valve driving device 54E are configured to be substantially symmetric with each other in the front-and-rear direction with respect to the cylinder axis line C.

As shown in FIG. 2, the air-intake side valve driving device 54I has an air-intake cam shaft 55I which is provided in parallel to the crankshaft 41 and rotationally driven by the crankshaft 41, a cam 58I which is provided to the air-intake cam shaft 55I and rotated integrally with the air-intake cam shaft 55I, and an air-intake side locker arm 57I which is swung by the cam 58I to open and close the air-intake valve 47. The air-intake side locker arm 57I is pivotally supported to be swingable by an air-intake side locker shaft 56 in parallel to the air-intake cam shaft 55I, and the swinging tip portion of the air-intake side locker arm 57I is connected to the air-intake valve 47. The air-intake side locker arm 57I is provided with a roller 74 which comes into rollable contact with the cam 58I.

The exhaust side valve driving device 54E has an exhaust cam shaft 55E which is provided in parallel to the crankshaft 41 and rotationally driven by the crankshaft 41, a cam 58E which is provided to the exhaust camshaft 55E and rotated integrally with the exhaust cam shaft 55E, and an exhaust side locker arm 57E which is swung by the cam 58E to open and close the exhaust valve 48. The exhaust side locker arm 57E is pivotally supported to be swingable by an exhaust side locker shaft 56E in parallel to the exhaust cam shaft 55E, and the swinging tip portion of the exhaust side locker arm 57E is connected to the exhaust valve 48. Furthermore, the exhaust side locker arm 57E is provided with a roller 74 which comes into rollable contact with the cam 58E.

The exhaust side valve driving device 54E is provided at the front portion side of the cylinder head 27 so as to sandwich the ignition plug 51 (see FIG. 3), and the air-intake side valve driving device 54I is provided at the rear portion side of the cylinder head 27 so as to sandwich the ignition plug 51.

Figure 3:
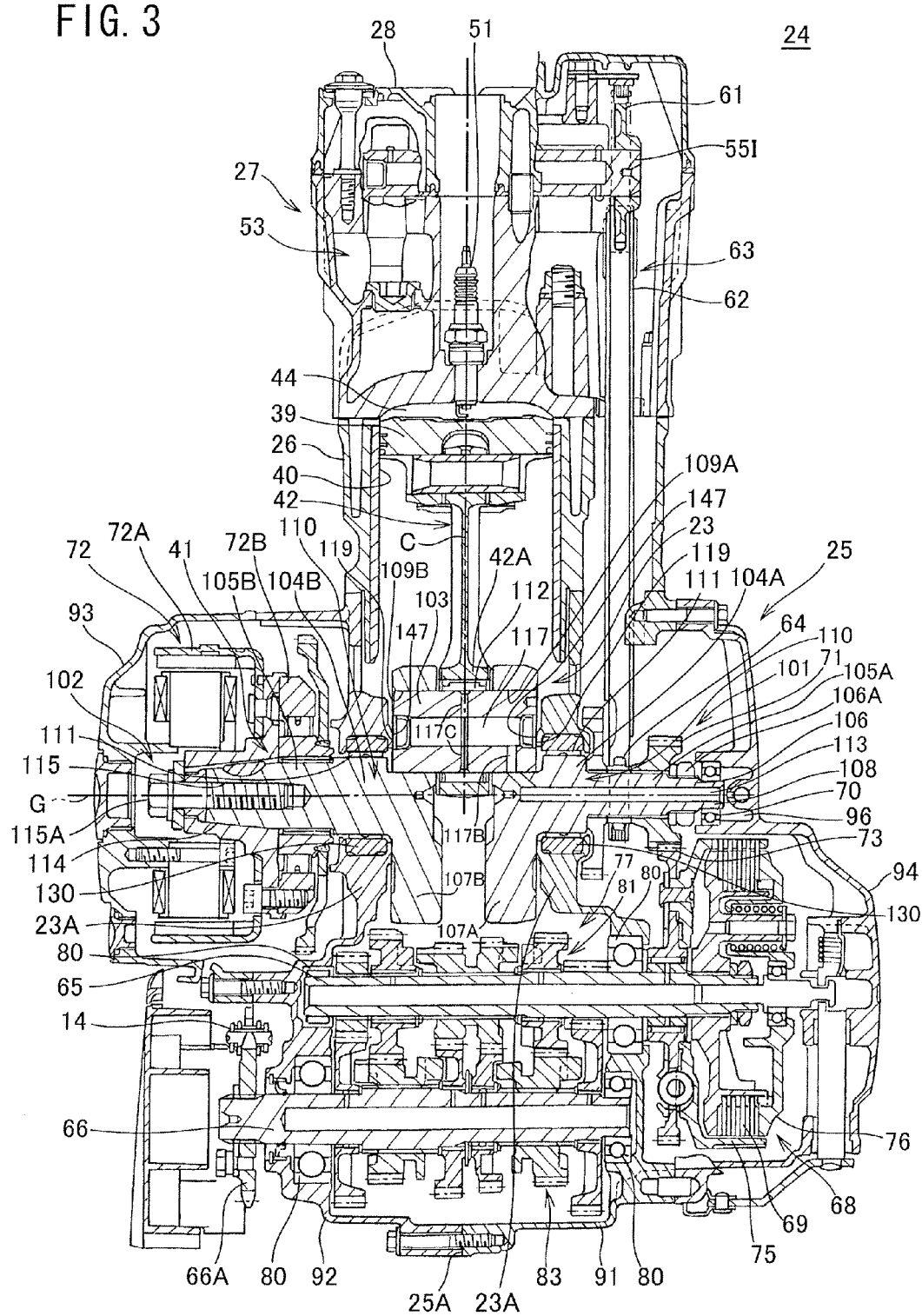
FIG. 3 is a cross-sectional view taken when the engine is viewed from the rear side thereof.

FIG. 3 is a cross-sectional view taken when the engine 24 is viewed from the rear side of the vehicle. Here, FIG. 3 shows a cross-section on which the cylinder axis line C, the crankshaft 41, the main shaft 65 and the counter shaft 66 are connected to one another. An air-intake cam shaft 55I and an exhaust cam shaft 55E are arranged in parallel to each other, and has driven sprockets 61 at one end sides in the axial direction thereof (the right surface side of the engine 24 in this embodiment) as shown in FIG. 3. The air-intake cam shaft 55I and the exhaust cam shaft 55E are rotated at the half rotation number of the rotation number of the crankshaft 41 by an endless cam chain 62 wound among a chain driving gear 64 of the crankshaft 41 and both the driven sprockets 61. A cam chain chamber 63 through which the cam chain 62 passes is formed at one end side of the cylinder head 27 and the cylinder block 26 so as to extend in the up-and-down direction.

As shown in FIG. 3, a driving gear 71 and a chain driving gear 64 which rotate integrally with the crankshaft 41 are provided to one endportion of the crankshaft 41, and an electrical generator 72 is provided to the other end side of the crankshaft 41. Specifically, an outer rotor 72A and a rotor support portion 72B of the electrical generator 72 which rotate integrally with the crankshaft 41 are fixed to the other end portion of the crankshaft 41.

The main shaft 65 is disposed at the rear side of the crankshaft 41, and a wet type clutch mechanism 68 for switching transmission of driving force between the crankshaft 41 and the main shaft 65 is provided to one end of the main shaft 65. The clutch mechanism 68 has a cylindrical clutch outer 75, and the clutch outer 75 is provided to be freely rotatable relatively to the main shaft 65. A driven gear 73 driven by the driving gear 71 of the crankshaft 41 is fixed o the clutch outer 75. A clutch inner 76 fixed to the main shaft 65 is provided inside the clutch outer 75, and plural friction plates 69 for frictionally connecting the clutch outer 75 and the clutch inner 76 are provided between the clutch outer 75 and the clutch inner 76.

The counter shaft 66 is provided at the rear side of the main shaft 65, and each of the main shaft 65 and the counter shaft 66 is supported through rolling bearings 80 provided to both the ends thereof in the crankcase 25.

A full-time engaging type transmission gear group 77 is disposed so as to straddle between the main shaft 65 and the counter shaft 66. Specifically, the main shaft 65 is provided with a driving gear train 81 for six speeds, and the counter shaft 66 is provided with a driven gear train 83 for six speeds which corresponds to the driving gear train 81. The gear shifting operation is performed by sliding the driving gear train 81 and the driven gear train 83 in the axial direction by the shift fork 79 driven by the shift drum 78 to establish a desired gear pair so that driving force can be transmitted through the gear pair.

A sprocket 66A for driving the driving chain 14 is fixed to the other end of the counter shaft 66 extending to the outside of the crankcase 25.

As shown in FIG. 2, the balancer shaft 67 is provided at the front side of the crankshaft 41, and a balancer 85 which rotates with a predetermined phase difference with respect to the rotation of the crankshaft 41 to reduce vibration of the engine 24 is fixed to the balancer shaft 67.

A stator motor 13 for rotating the crankshaft 41 to start up the engine 24 is disposed behind the cylinder block 26 at the upper portion of the crankcase 25.

Furthermore, an oil pump 86 for feeding out oil as lubricant oil to each part of the engine 24 is provided below the crankshaft 41. An oil pan 84 in which oil is stocked is formed at the lower portion of the crankcase 25.

As shown in FIG. 3, the crankcase 25 comprises right-left split crankcases which are coupled to each other from both the sides in the axial direction of the crankshaft 41 so as to sandwich the crankshaft 41 therebetween, and it is constructed by one side case 91 at the clutch mechanism 68 side (the right side of the vehicle) and the other side case 92 at the electrical generator 72 side (the left side of the vehicle). A split face 25A between the one side case 91 and the other side case 92 is substantially coincident with a plane which passes through the cylinder axis line C and extends in the front-and-rear direction of the vehicle. Here, the one side case 91 and the other side case 92 are manufactured by casting aluminum alloy.

The engine 24 is a single cylinder engine having one cylinder bore 40, and the length of the crankshaft 41 is relatively small. Therefore, an up-down split crankcase which is split into two parts in the up-and-down direction of the crankshaft like a parallel multicylinder engine is not used, but a right-left split crankcase(s) 25 may be used.

A generator cover 93 is secured to the outside of the other side case 92. The left portion of the crankshaft 41 and the electrical generator 72 are covered by the generator cover 93. A clutch cover 94 is secured to the outside of the one side case 91, and the right portion of the crankshaft 41 and the clutch mechanism 68 are covered by the clutch cover 94.

Crankshaft support holes 110 (bearing press-fit holes) for supporting journal portions 104A and 104B (bearing portions) of the crankshaft 41 are provided in a holding wall 23A (support member) comprising the respective right and left side walls of the crank chamber 23. Slide bearings 111 (crank bearings) fitted to the journal portions 104A and 104B are arranged in the respective crankshaft support holes 110, and the crankshaft 41 is supported through the slide bearings 111 by fluid lubricant oil film using oil as an operation fluid. Each holding wall 23A is a support member for supporting the crankshaft 41 through the crankshaft support hole 110.

Figure 4:
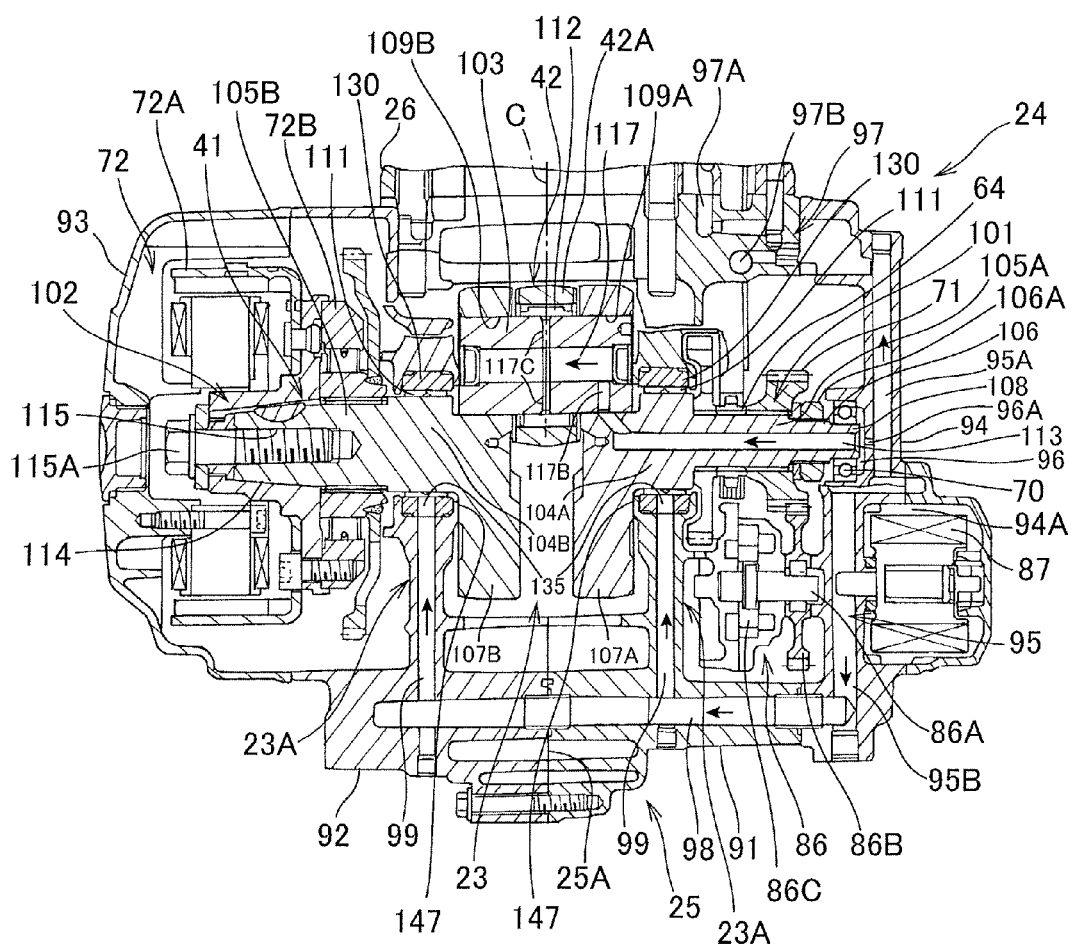
FIG. 4 is a front cross-sectional view showing the neighborhood of an oil pump in a crankcase.

FIG. 4 is a front cross-sectional view showing the neighborhood of the oil pump 86 in the crankcase 25.

As shown in FIG. 4, the oil pump 86 is provided below the driving gear 71 of the crankshaft 41, and the oil pump 86 is a trochoid type pump having a shaft portion 86A supported by the one side case 91, a driven gear 86B which is provided to the shaft portion 86A and is engaged with the driving gear 71, and a rotor 86C fixed to the shaft portion 86A. The rotor 86C is rotated through the driven gear 86B and the shaft portion 86A by the driving gear 71 which rotates integrally with the crankshaft 41, and feeds out oil stocked in the oil pan 84 (see FIG. 2). The oil pump 86 is provided to be shifted to one side in the axial direction of the crankshaft 41.

An oil filter 87 for collecting foreign materials, etc. in the oil is provided at the discharge side of the oil pump 86. The oil filter 87 is accommodated in a filter accommodating portion 94A provided to the clutch cover 94.

A relief valve (not shown) for adjusting hydraulic pressure by releasing oil whose pressure increases to be higher than a predetermined value is provided to an oil path through which the oil pump 86 and the oil filter 87 are connected to each other. The oil released by the relief valve is returned to the suction side of the oil pump 86.

The exit of the oil in the oil filter 87 is connected to a branch oil path 95 formed in the clutch cover 94. The branch oil path 95 branches into two upward and downward directions and extends in the clutch cover 94. An upwardly-branching upper oil path 95A (an oil supply path for the valve driving system) is connected to a crank-side oil path 96 connected to the shaft-end side support portion 108 (crankshaft end) side of the crankshaft 41, and an upper oil path 97 which is formed at the upper portion of the one side case 91 and connected to the valve driving side. The upper oil path 97 is bifurcated and connected to a head-side oil path 97A extending to the valve driving chamber 53 side of the cylinder head 27 and a transmission side oil path 97B extending to the transmission gear group 77.

The crank-side oil path 96 has a small hole 96A having an orifice-shape (diaphragm portion) penetrating through the wall portion of the upper oil path 95A, and oil in the upper oil path 95A which diverges through the small hole 96A flows to the shaft end side support portion 108 of the crankshaft 41. The diameter of the small hole 96A is reduced to be smaller than the diameter of the upper oil path 95A, and the amount of oil flowing to the crank side oil path 96 is limited by the small hole 96A.

The lower oil path 95B extending downwards in the branch oil path 95 is connected to a bottom portion oil path 98 which extends in the vehicle width direction at the bottom portion of the crankcase 25. The bottom portion oil path 98 is formed so as to straddle between the one side case 91 and the other side case 92. The bottom portion oil path 98 is connected to each of journal oil paths 99, 99 (inner passages in the crankcase) extending upwards to the crankshaft 41 side through the respective holding walls 23A of the crank chamber 23 in the one side case 91 and the other side case 92 respectively, and the journal oil paths 99, 99 are connected to the respective slide bearing 111 sides.

Figure 5:
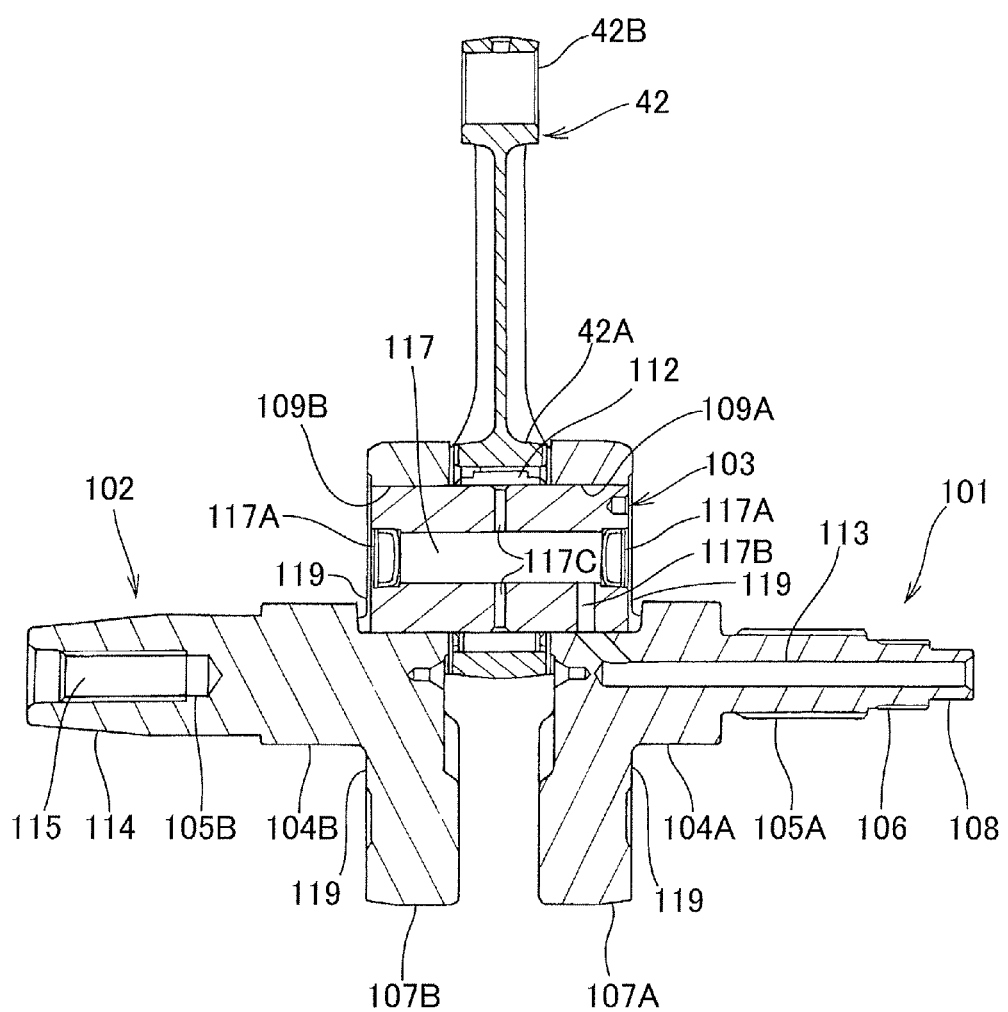
FIG. 5 is a front cross-sectional view taken when the crankshaft is viewed from the front side.

FIG. 5 is a front cross-sectional view taken from the front side of the crankshaft 41.

The crankshaft 41 is an assembly type crankshaft which is manufactured while both the end portions thereof are separated from a crankpin 103 (crankpin portion), and it has one-side shaft 101 supported by the one-side case 91, the other-side shaft 102 supported by the other-side case 92 and the crankpin 103 through which the one-side shaft 101 and the other-side shaft 102 are connected to each other.

A big end portion 42A of the connecting rod 42 (con-rod big end) is connected to the crankpin 103 through a roller bearing 112 as a rolling bearing (rolling bearing). The piston 39 is connected to a small end portion 42B of the connecting rod 42.

As shown in FIGS. 3 and 5, the one-side shaft 101 has a plate-like crank web 107A at the base end portion thereof, and also has a journal portion 104A supported by the one-side case 91, a joint portion 105A to which the chain driving gear 64, the driving gear 71, etc. are splined, a fixing portion 106 provided with a nut 106A for fixing the driving gear 71 in the axial direction, and a shaft end side support portion 108 supported through a bearing 70 by a clutch cover 94, which are successively arranged from the crank web 107A side.

The one-side shaft 101 is formed to be stepwise narrower from the crank web 107A to the shaft end side support portion 108, and the diameter of the journal portion 104A is set to be larger than the diameter of the joint portion 105A. The surface of the journal portion 104A is formed to be a smooth mirror surface by super finishing so as to have surface roughness suitable for the sliding bearing 111. A pin press-fit hole 109A to which one end of the crankpin 103 is joined is formed at an end in the radial direction of the crank web 107. Furthermore, a thrust face 119 which comes into freely sliding contact with the holding wall 23A to regulate the movement of the crankshaft 41 in the axial direction is formed on the outer surface of the crank web 107A in the axial direction of the crankshaft 41. The one-side shaft 101 has an in-shaft oil path 113 (an oil path penetrating in the shaft) extending from the shaft end side support portion 108 to the base end portion side, and the in-shaft oil path 113 intercommunicates with a crank-side oil path 96 of the clutch cover 94.

The other-side shaft 102 has a plate-like crank web 107B at the base end portion thereof, and also has a journal portion 104B supported by the other-side case 92, a joint portion 105B to which the rotor support portion 72B of the electrical generator 72 is splined, a taper portion 114 which is formed to be tapered to the tip side, and a female screw portion 115 extending from the tip side to the base end side in the axial direction. The outer rotor 72A is fitted to the taper portion 114, and the outer rotor 72A is fastened to the rotor support portion 72B. Furthermore, the outer rotor 72A is pressed and fixed in the axial direction by a bolt 115A fastened to the female screw portion 115.

The diameter of the journal portion 104B is set to be larger than the diameter of the joint portion 105B. The surface of the journal portion 104B is formed to be a smooth mirror surface by super finishing so as to have surface roughness suitable for the slide bearing 111.

Furthermore, a pin press-fit hole 109B to which the other end of the crankpin 103 is joined is formed at an end in the radial direction of the crank web 107B. Furthermore, a thrust surface 119 which comes into contact with the holding wall 23A to regulate the movement in the axial direction of the crankshaft 41 is formed on the outer surface of the crank web 107B in the axial direction of the crankshaft 41.

The crankpin 103 is a cylindrical pin whose diameter is slightly larger than the pin press-fit holes 109A and 109B, and both the ends thereof are fixedly pressed into the pin press-fit holes 109A and 109B. An internal oil path 117 penetrating in the axial direction is formed in the crankpin 103, and both the ends of the internal oil path 117 are blocked by plugs 117A. Furthermore, the crankpin 103 has an oil path 117B through which the internal oil path 117 and the in-shaft oil path 113 of the one-side shaft 101 are connected to each other, and a big end side oil path 117C through which the internal oil path 117 intercommunicates with the roller bearing 112 of the big end portion 42A.

The crankshaft 41 is assembled by performing press-fit with a hydraulic press machine or the like while supported under a predetermined state by using an assembling jig (not shown). Specifically, the one-side shaft 101 and the other-side shaft 102 are supported by the above assembling jig which are fitted to the joint portions 105A and 105B at both the outsides of the journal portions 104A and 104B, and under this state, the one-side shaft 101 and the other-side shaft 102 are pressed into both the sides of the crankpin 103 with which the con-rod 42 is temporarily assembled, thereby integrally fabricating the crankshaft 41.

As described above, the assembling work is performed while the joint portions 105A and 105B whose diameters are smaller than the diameters of the journal portions 104A and 104B are supported at both the outsides of the journal portions 104A and 104B by the jig, whereby the jig can be prevented from coming into contact with the surfaces of the journal portions 104A and 104B and damaging the super-finished surfaces when the assembling work is performed. Accordingly, the journal portions 104A and 104B can be subjected to super finishing before the assembling work, and thus it is unnecessary to execute super finishing on the crankshaft 4 which has been assembled in a relatively large size after the assembling work. Therefore, the processing facilities for the super finishing can be made small and simple, and also the productivity can be enhanced.

Next, the flow of oil of the engine 24 will be described with reference to FIG. 4. Arrows in FIG. 4 represent the flowing directions of the oil.

Oil in the oil pan 84 is discharged from the oil pump 86 in connection with actuation of the engine 24, passes through the oil filter 87 and flows into the branch oil path 95. When the pressure of the oil becomes high, a part of the oil is returned to the suction side of the oil pump 86 by the relief valve. Subsequently, the oil in the branch oil path 95 flows to the upper oil path 95A. This oil is supplied to the crank-side oil path 96, and also is passed through the head-side oil path 97A, and supplied to the valve driving chamber 53 and the transmission gear group 77.

The oil supplied into the crank-side oil path 96 flows into the in-shaft oil path 113 of the one-side shaft 101, passes through the oil path 117B, the internal oil path 117 and the big end side oil path 117C of the crankpin 103, and then is supplied to the roller bearing 112 of the con-rod 42.

Furthermore, the remaining oil flowing into the branch oil path 95 passes through the lower oil path 95B, flows downwards, passes through the bottom oil path 98 and the journal oil paths 99, 99 and then is supplied to the slide bearings 111. The oil which lubricates the respective parts moves downwardly in the engine 24, and returns to the oil pan 84.

That is, the crankshaft 41 is supplied with one oil passing through the crank-side oil path 96 and flowing from the in-shaft oil path 113 to the roller bearing 112 of the big end portion 42A and the other oil flowing from the journal oil paths 99, 99 of the respective holding walls 23A to the slide bearings 111.

As described above, in this embodiment, the journal portions 104A and 104B at both the ends of the crankshaft 41 are supported by the respective slide bearings 111, and also the big end portion 42A of the con-rod 42 is supported by the roller bearing 112 as the rolling bearing. Therefore, the oil supply amount of the big end portion 42A can be more greatly reduced as compared with the construction that the big end portion 42A is supported by the slide bearing. Therefore, the journal portions 104A and 104B are supported by the slide bearings 111 to be miniaturized, the required oil supply amount can be reduced and the oil pump 86 can be miniaturized. Furthermore, the journal portions 104A and 104B which are directly supported by the crankcase 25 are supported by the slide bearings 111. Therefore, crank hammering sound occurring between the crankshaft 41 and the crankcase 25 can be reduced, and the crankcase 25 can be prevented from echoing, so that the crank hammering sound can be effectively reduced.

Furthermore, in the engine 24, the lower oil path 95B connecting to the exit of the oil filter 87 extends downwards, and gravitational force makes the oil flow easily through the lower oil path 95B. Therefore, the oil can be stably supplied to the slide bearings 111 through the journal oil paths 99, 99.

Furthermore, one oil introduced to the big end portion 42A passes through the shaft end side support portion 108 to the in-shaft oil path 113 separately from the other oil introduced from the journal oil paths 99, 99 of the respective holding walls 23A to the slide bearings 111. Therefore, separately from the other oil, the oil amount of the one oil is restricted by the small hole 96, and the oil supply amount of the in-shaft oil path 113 can be reduced to an oil supply amount optimum to the roller bearing 112 of the big end portion 42A.

Figure 6:
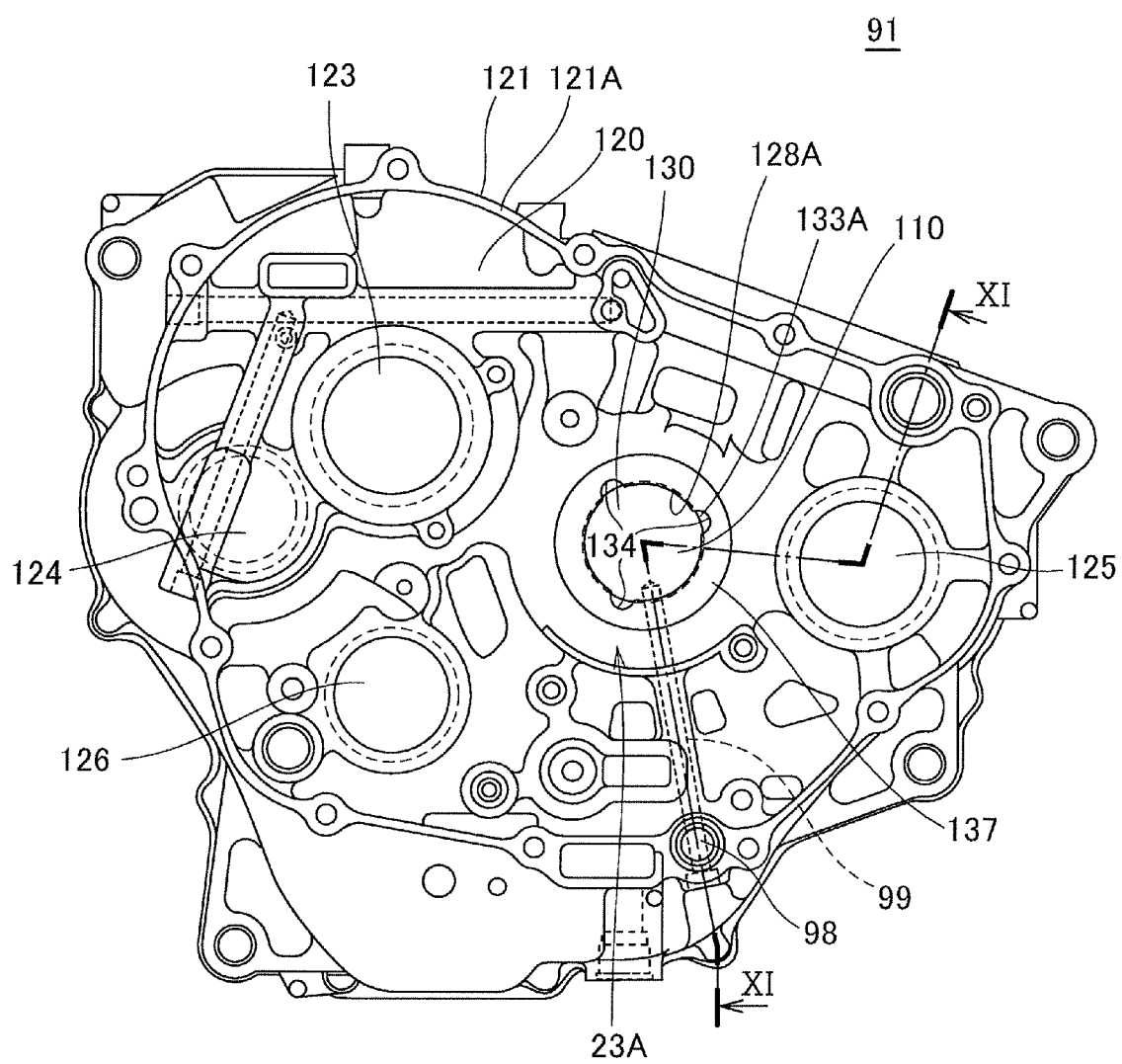
FIG. 6 is a side view showing the outer surface of one-side case.
Figure 7:
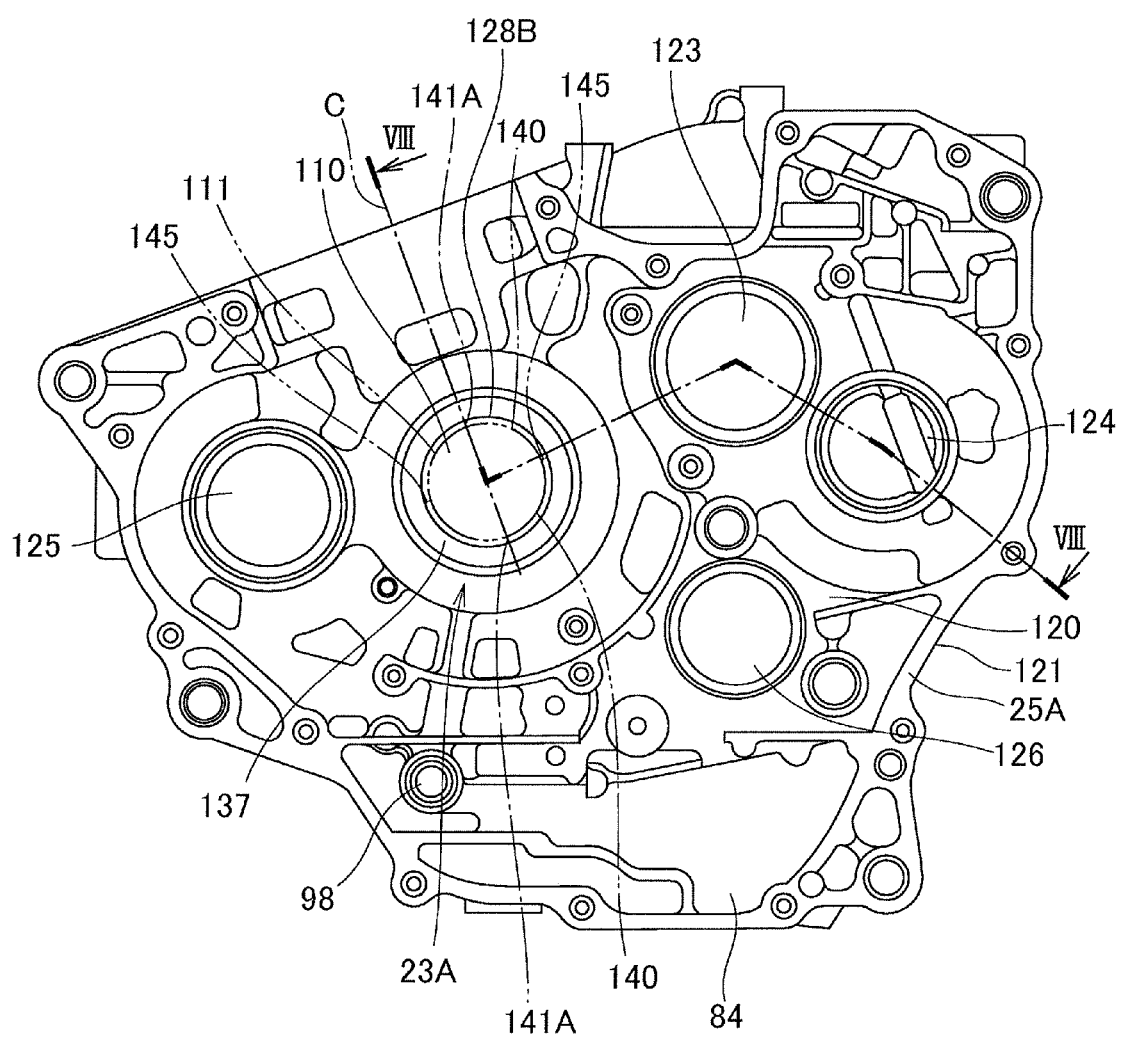
FIG. 7 is a side view showing the inner surface of the one-side case.
Figure 8:
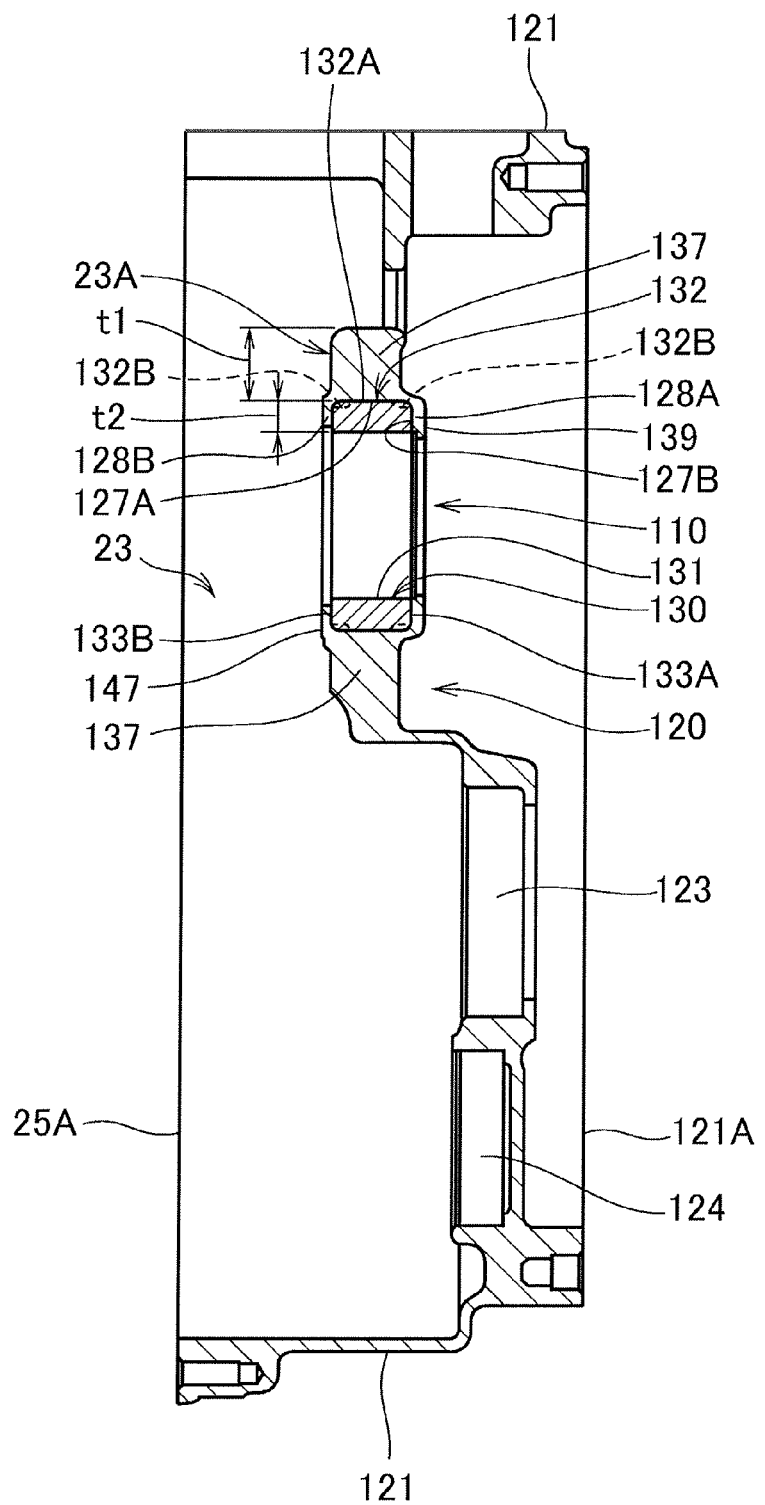
FIG. 8 is a cross-sectional view taken along VIII-VIII.

FIG. 6 is a side view showing the outer surface of the one-side case 91. FIG. 7 is a side view showing the inner surface of the one-side case 91. FIG. 8 is a cross-sectional view taken along VIII-VIII of FIG. 7. Here, the slide bearing 111 is represented by a two-dotted chain line in FIG. 7.

A support structure of the crankshaft 41 by the slide bearings 111 will be described in detail. However, this support structure is formed to be substantially symmetrical between the right and left sides with respect to the cylinder axis line C as shown in FIG. 4 in the one-side case 91 and the other-side case 92. Therefore, the support structure at the one-side case 91 side will be mainly described, and the detailed description of the support structure at the other-side case 92 side is omitted.

As shown in FIGS. 6 to 8, the one-side case 91 has a side surface plate portion 120 (peripheral wall) which is substantially perpendicular to the shaft direction of the crankshaft 41, and a wall portion 121 projecting in the inner and outer direction of the crankcase 25 along the peripheral edge portion of the side surface plate portion 120. The inner end surface of the wall portion 121 serves as a split face 25A serving as a mating face to the other-side case 92. The outer end surface of the wall portion 121 serves as a mating face 121A to the clutch cover 94.

The side surface plate portion 120 is provided with a crankshaft support hole 110 for supporting the one-side shaft 101, a main shaft support hole 123 for supporting one end of the main shaft 65, a counter shaft support hole 124 for supporting one end of the counter shaft 66, a balancer shaft support hole 125 for supporting one end of the balancer shaft 67, and a shift drum support hole 126 for supporting one end of the shift drum 78.

An annular bush 130 for receiving the slide bearing 111 is disposed on the inner peripheral surface of the crankshaft support hole 110. The bush 130 is formed of cast iron having higher rigidity and hardness than the crankcase 25 formed of aluminum alloy. The bush 130 is disposed in a casting mold (not shown) for manufacturing the one-side case 91, and it is casted in the casting mold at the time when the one-side case 91 is casted, whereby the bush is integrally provided to the one-side case 91.

The bush 130 is casted in the holding wall 23A which is formed to be thicker than the plate thickness of the surrounding at the side surface plate portion 120. As shown in FIGS. 7 and 8, the holding wall 23A is larger in diameter than the bush 130, and formed in a disc-like shape which is substantially coaxial with the crankshaft support hole 110.

As described above, the bush 130 is provide din the holding wall 23A having a large plate thickness and high strength, whereby the support rigidity of the crankshaft 41 can be enhanced.

Figure 9:
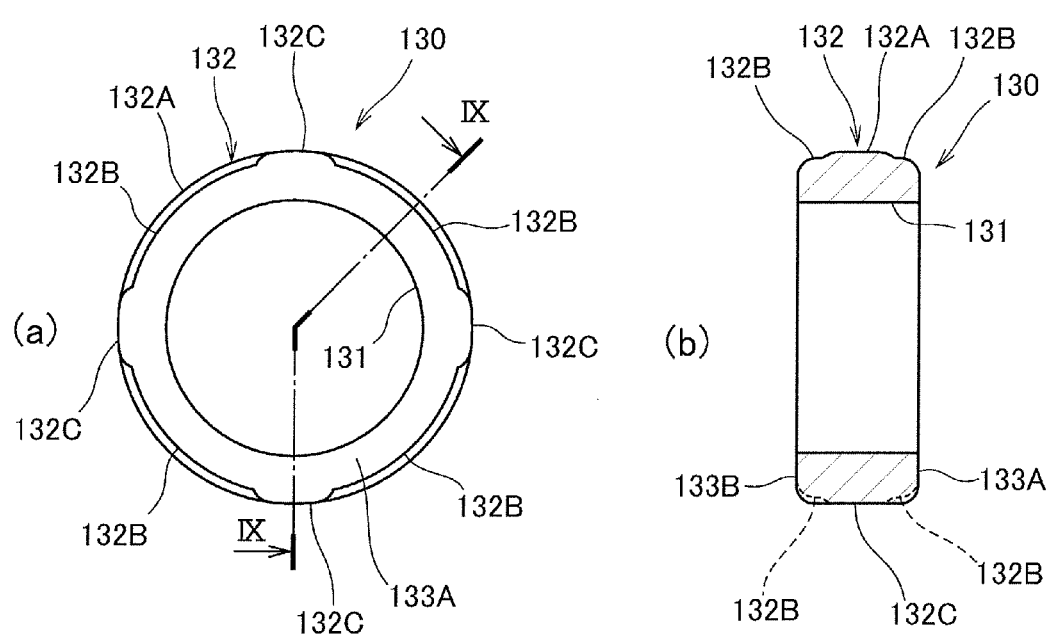
FIG. 9 is a diagram showing a bush.

FIG. 9 is a diagram showing the bush 130, wherein FIG. 9(a) is a side view and FIG. 9(b) is a cross-sectional view taken along IX-IX of FIG. 9(a).

As shown in FIG. 9, the bush 130 has an inner peripheral surface 131 (inner periphery) to which the slide bearing 111 is pressed and an outer peripheral surface 132 (outer periphery) joined to the holding wall 23A. The inner peripheral surface 131 is a flat surface having no groove formed thereon. Both the side surface portions 133A and 133B of the bush 130 (both the side surfaces of the bush) are formed to be substantially vertical to the axial direction of the bush 130.

The outer peripheral surface 132 has a diameter-increased portion 132A which is increased in diameter like a ring at the center in the width direction of the outer peripheral surface 132, and whirl-stop portions 132B which are concaved to the inner peripheral side at both the sides of the diameter-increased portion 132A. The whirl-stop portions 132B are formed at plural places (four places in this embodiment) at each of both the sides of the diameter-increased portion 132A so as to be spaced from one another at even intervals in the peripheral direction. An extension portion 132C is provided between the respective whirl-stop portions 132B by extending the diameter-increased portion 132A in the width direction, and the whirl-stop portions 132B are formed so as to be arranged discontinuously in the peripheral direction.

Figure 10:
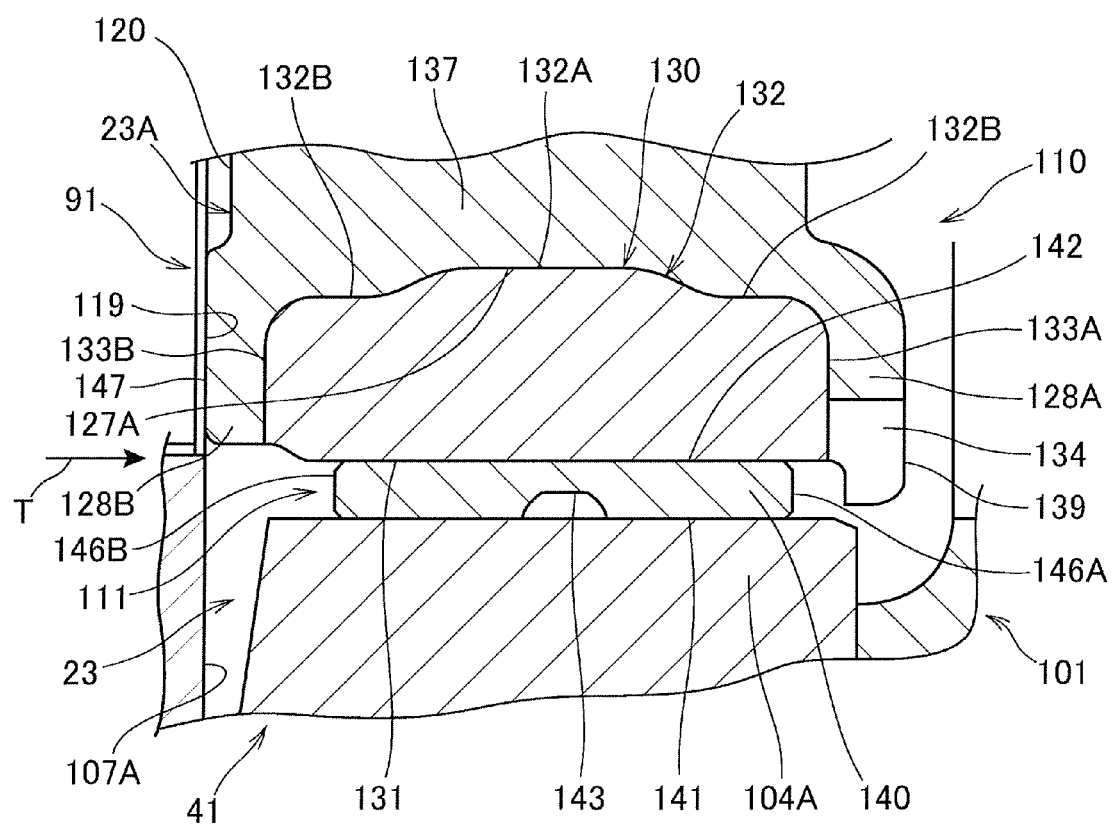
FIG. 10 is an enlarged cross-sectional view showing the neighborhood of a crankshaft support hole of the one-side case in FIG. 4.

FIG. 10 is an enlarged cross-sectional view showing the neighborhood of the crankshaft support hole 110 of the one-side case 91 in FIG. 4.

As shown in FIGS. 8 and 10, the holding wall 23A of the one-side case 91 has an inner peripheral joint face 127A joined to the outer peripheral surface 132 of the bush 130, large-width cover portions 128A and 128B for covering both the side surface portions 133A and 133B of the bush 130, and a narrow-width bush support portion 137 which is located at the outer peripheral surface 132 side of the bush 130 and has a larger width than the side surface plate portion 120 and a smaller width than the large-width cover portions 128A and 128B.

The large-width cover portions 128A and 128B projects to the inner peripheral side along both the side surface portions 133A and 133B. Referring to FIG. 4 in combination, an oil pool wall 139 which further extends to the inner peripheral side as compared with the inner peripheral surface 131 of the bush 130 is formed at the large-width cover portion 128A (cover portion) as a side portion at the opposite side (con-rod counter side) to the con-rod 42 in the large-width cover portions 128A and 128B.

A thrust receiving face 147 (thrust receiver) which comes into contact with the thrust face 119 of the crank web 107A is formed on the side surface of the large-width cover portion 128B as the side portion at the con-rod 42 side in the large-width cover portions 128A and 128B.

Oil supplied to the slide bearing 111 passes through the gap between the journal portion 104A and the bush 130 and flows downwards, and a part of the downwardly-flowing oil is supplied to the thrust face 119 and the thrust receiving face 147. In this embodiment, the oil pool wall 139 is formed at the con-rod counter side to restrict the amount of oil leaking from the con-rod counter side. Therefore, a proper amount of oil can be supplied to the thrust face 119 and the thrust receiving face 147 at the con-rod side.

As shown in FIG. 8, the thickness t1 in the radial direction of the bush support portion 137 is set to be twice or more as large as the thickness t2 in the radial direction of the bush 130 over the whole periphery. In this embodiment, the thickness t1 is set to be twice or more as large as the thickness t2. As described above, the bush 130 is supported by the bush support portion 137 having the thickness t1 which is not less than the thickness t2 in the radial direction of the bush 130. Therefore, the bush 130 can be stably supported, and a thermal effect and a distortion effect which the bush 130 suffers from the side surface plate portion 120 can be dispersed and moderated.

The inner peripheral joint face 127A of the holding wall 23A is joined to the diameter-increased portion 132A and the whirl-stop portions 132B of the bush 130, and when the bush 130 is casted, a part of the inner peripheral joint face 127A intrudes into the discontinuously-arranged whirl-stop portions 132B. Furthermore, the contact area between the inner peripheral joint face 127A and the outer peripheral face 132 is kept to be large due to existence of the whirl-stop portions 132B. As described above, the force in the rotational direction of the bush 130 is received by the whirl-stop portions 132B and also the large contact area of the joint face of the bush 130 can be secured, so that the bush 130 can be firmly joined to the crankshaft support hole 110.

The bush 130 is casted under the state that the side surface portion 133A thereof at the outside is supported by plural support legs (not shown) provided to the casting mold in the casting process of the one-side case 91, and the support legs are removed after the bush 130 is casted. As shown in FIG. 6, cut-out grooves 134 which occur due to the removal of the support legs are formed on the large-width cover portion 128A of the outer surface of the one-side case 91. The cut-out grooves 134 are formed at three places at an interval of substantially 120° along the inner peripheral surface of the crankshaft support hole 110. Each cut-out groove 134 is formed to have a substantially moderate U-shape so as to connect to the inner peripheral surface of the large-width cover portion 128A.

As described above, each cut-out groove 134 is provided to be shifted to the inside in the radial direction so as to connect to the inner peripheral surface of the large-width cover portion 128A, and the size of each cut-out groove 134 can be reduced. Therefore, the strength of the large-width cover portion 128A can be secured. For example, when a circular cavity portion is provided as a cut-out groove at a further outside position in the radial direction, a thin-walled portion is formed between the cavity portion and the large-width cover portion 128A, and thus a chip is liable to occur.

Furthermore, each cut-out groove 134 is located at the tip portion at the inner peripheral side of the large-width cover portion 128A which is far away from the outer peripheral surface 132 of the bush 130, and a stress applied to the bush 130 hardly acts on each cut-out groove 134. Therefore, a chip or the like can be prevented from occurring in the large-width cover portion 128A in the neighborhood of each cut-out groove 134.

Furthermore, excess oil out of oil flowing to the con-rod counter side can be discharged through the cut-out grooves 134, and the supply amount of oil to the thrust face 119 side can be adjusted to a proper value.

Figure 11:
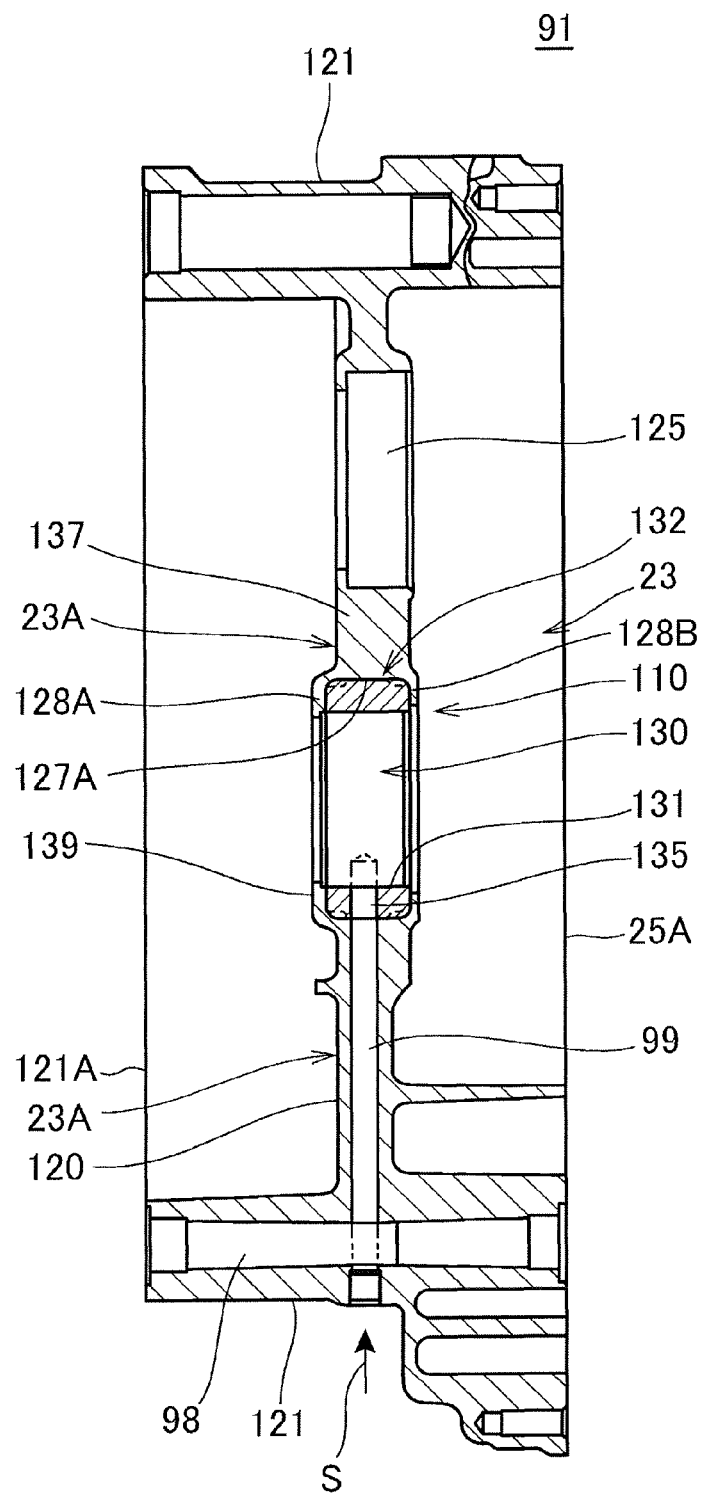
FIG. 11 is a cross-sectional view taken along XI-XI in FIG. 6.

FIG. 11 is an XI-XI cross-sectional view of FIG. 6.

As shown in FIG. 11, the bottom oil path 98 is located below the crankshaft support hole 110 in the one-side case 91, and penetrates through the one-side case 91 in the vehicle width direction. The bottom oil path 98 intercommunicates with the journal oil path 99, and the journal oil path 99 extends upwards in the side surface plate portion 120. The upper end of the journal oil path 99 intercommunicates with a bush oil path 135 penetrating through the bush 130 in the radial direction (a through-hole in the radial direction).

The journal oil path 99 and the bush oil path 135 are formed by drilling holes in the one-side case 91 having the bush 130 casted therein with a drill (not shown) which is inserted from the lower surface of the one-side case 91 so as to intercommunicate with the bottom oil path 98 as indicated by an arrow S in FIG. 11. As described above, the journal oil path 99 and the bush oil path 135 are coaxially processed at the same time after the bush 130 is casted. Therefore, it is unnecessary to position the journal oil path 99 and the bush oil path 135 to each other when the bush 130 is casted, and the workability of the production can be enhanced. Furthermore, when the bush 130 is casted, the bush oil path 135 is not blocked by molten metal.

Furthermore, the inner diameter of the bush 130 has not been finished before the bush 130 is casted, and it is finished with high precision in conformity with the press-fit dimension of the slide bearing 111 after the bush 130 is casted.

In this embodiment, the annular bush 130 is casted while the crankcase 25 is designed not to be split into upper and lower parts, but to be split into right and left parts. Therefore, no parting plane exists on the inner peripheral surface 131 of the bush 130, the inner peripheral surface 131 can be easily circularly processed with high precision and the productivity can be enhanced.

Figure 12:
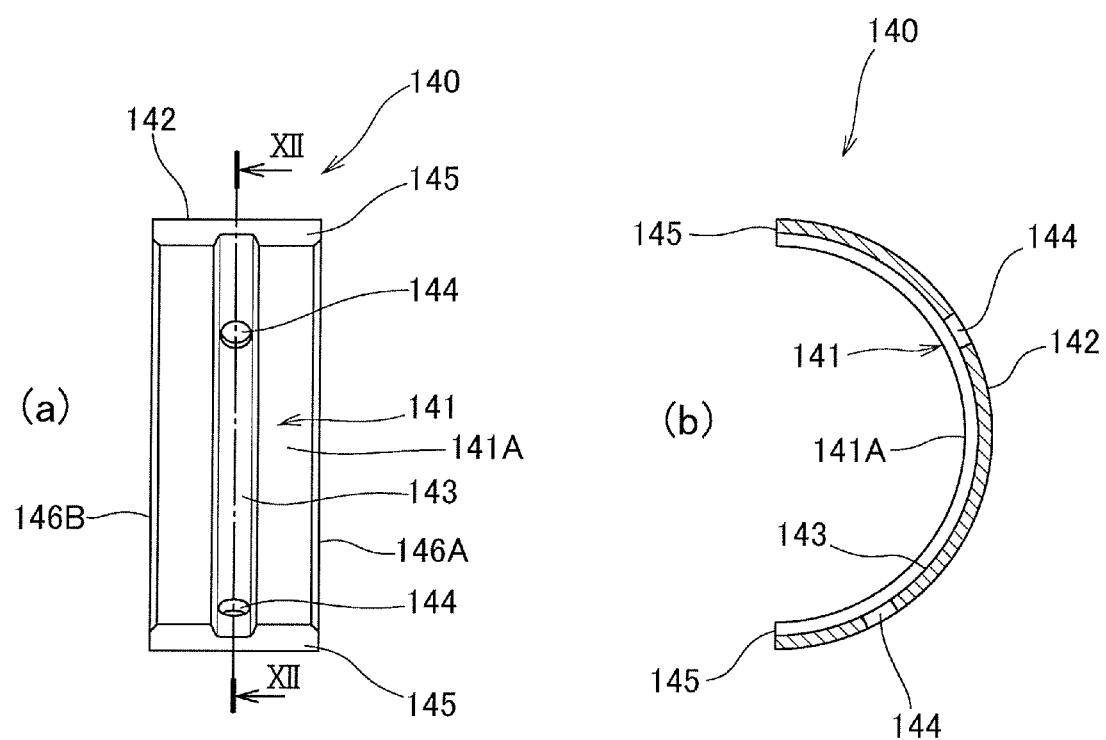
FIG. 12 is a diagram showing a slide bearing.

FIG. 12 is a diagram showing the slide bearing 111, FIG. 12(a) is a front view, and FIG. 12(b) is an XII-XII cross-sectional view of FIG. 12(a).

The slide bearing 111 is constructed by a pair of halved bodies 140, 140 (see FIG. 7 and FIG. 12) which are formed by bisecting the ring in a semicircular shape with a plane passing through the axis line G (see FIG. 3) of the crankshaft 41. Here, FIG. 12 shows one halved body 140 of the slide bearing 111.

The halved body 140 is designed to have a circular arcuate shape, and has a receiving surface 141 for receiving the journal portion 104A (the journal portion 104B in the other-side case 92) at the inner peripheral side, and a press-fit surface 142 pressed into the bush 130 at the outer peripheral side thereof.

An oil groove 143 is formed at the center in the width direction of the receiving surface 141 so as to extend over the whole receiving surface 141 in the peripheral direction. Oil holes 144 penetrating through the halved body 140 are formed at two places in the oil groove 143. The pair of halved bodies 140, 140 are the same parts.

Here, the halved body 140 is a so-called metal bearing type halved body obtained by coating copper alloy on the inner peripheral surface of an arcuate steel product as a base and further subjecting the surface of the copper alloy layer to tin plating.

Both the end faces in the peripheral direction of each halved body 140 serve as a pair of split faces 145 through which the pair of halved bodies 140, 140 mate with each other. The plane on which the split faces 145 are located is a flat plane which passes through the axis line of the slide bearing 111 and is parallel to the axis line. The axis line of the slide bearing 111 is coincident with the axis line G of the crankshaft 41.

The split faces 145 are processed to be flat by machining such as cutting, grinding or the like. Therefore, the contact area between the split faces 145 under the state that the halved bodies 140, 140 are mated with each other can be secured to be large, the assembling workability can be enhanced, and the halved bodies 140, 140 can be mated with each other under a more stable state.

Furthermore, both the side surfaces 146A, 146B in the width direction of the halved body 140 (both the side surfaces in the axis direction of the slide bearing) are substantially perpendicular to the axis line of the slide bearing 111, and finished as flat faces.

As shown in FIG. 10, the width of the slide bearing 111 is formed to be smaller than the width of the bush 130, and the slide bearing 111 is pressed in so as to be located substantially at the center in the width direction of the bush 130. Specifically, as indicated by an arrow T of FIG. 10, the slide bearing 111 is pressed in by a machine tool for pressing the side surface 146B at the crank chamber 23 side. At this time, the side surface 146B is finished to be flat. Therefore, the contact area between the machine tool and the side surface 146B can be secured, and force can be correctly applied in the press-fit direction, so that the press-fit workability can be enhanced.

Furthermore, the bush 130 is disposed in the crankshaft support hole 110, and the slide bearings 111 are not pressed into the crankcase 25 of aluminum alloy, but pressed into the bushes 130 of cast iron which is higher in rigidity and hardness than the crankcase 25. Therefore, an interference for press-fit can be secured to be high, and the slide bearings 111 can be more firmly fixed.

Furthermore, the width of the slide bearing 111 is smaller than the width of the bush 130, both the side surfaces 146A, 146B of the slide bearing 111 are away from the large-width cover portions 128A, 128B of the one-side case 91, and the large-width cover portions 128A, 128B are prevented from coming into contact with the slide bearings 111 due to thermal expansion of the engine 24 caused by heat. Therefore, the assembling positions of the slide bearings 111 can be kept to correct positions.

As shown in FIG. 7, the slide bearing 111 is pressed into the bush 130 while the pair of split faces 145 are oriented to be substantially perpendicular to the cylinder axis line C. Here, the force applied to the slide bearing 111 through the journal portions 104A, 104B in connection with the vertical motion of the piston 39 (see FIG. 2) acts in the extension direction of the cylinder axis line C, and this force greatly acts on the arcuate apex portion 141A of the halved body 140.

In this embodiment, the halved body 140 is disposed so that the split faces 145 are substantially perpendicular to the cylinder axis line C, and the force caused by the vertical motion of the piston 39 can be prevented from greatly acting on the split faces 145, so that the crankshaft 41 can be more stably supported by the slide bearings 111.

Furthermore, the oil holes 144 (see FIG. 12) of the halved body 140 are formed so as to intercommunicate with the bush oil path 135 of the bush 130 under the state that the halved body 140 is disposed so that the split faces 145 are substantially perpendicular to the cylinder axis line C.

The oil supplied to the journal oil path 99 by the oil pump 86 is passed through the bush oil path 135 and the oil holes 144 and supplied to the oil groove 143 at the inner peripheral side of the halved body 140. The journal portions 104A, 104B are lubricated through the oil grooves 143 provided over the whole peripheries of the journal portions 104A, 104B.

In this embodiment, the inner peripheral surface 131 of the bush 130 is a flat surface having no groove, and the bush oil path 135 is provided at only one place. Therefore, the rigidity of the bush 130 can be enhanced, and the crankshaft 41 can be stably supported. Furthermore, the inner peripheral surface 131 is a flat surface having no groove, and the thermal expansion of the bush 130 can be made uniform, so that the crankshaft 41 can be stably supported. In addition, the side surface 146A of the halved body 140 is not stuck in a groove when pressed in. Therefore, the assembling workability can be enhanced.

As shown in FIGS. 3 and 4, the bush 130 is casted in the crankshaft support hole 110 of the other-side case 92 as in the case of the one-side case 91, and the slide bearing 111 is pressed into this bush 130 from the crank chamber 23 side.

The crankshaft 41 is assembled with the crankcase 25 by fitting the one-side and other-side cases 91 and 92 having the slide bearings 111 pressed therein from both the sides in the axial direction of the crankshaft 41 so that the journal portions 104A, 104B are fit in the respective slide bearings 111.

As described above, according to the embodiment to which the present invention is applied, the slide bearings 111 are applied to the bearings for supporting the journal portions 104A, 104B of the crankshaft 41, and the roller bearing as the rolling bearing is applied to the bearing of the big end portion 42A of the con-rod 42, so that the amount of oil supplied to the roller bearing 112 of the big end portion 42A can be reduced. Accordingly, the oil amount to be supplied can be reduced with miniaturizing the two bearings of the journal portions 104A, 104B of the crankshaft 41 by applying the slide bearings 111, so that the oil pump 86 can be miniaturized.

Furthermore, the split faces 145 and both the side surfaces 146A, 146B in the axial direction of the bisectionally constructed slide bearing 111 are designed to be flat, and the areas of the side surface 146B and the split faces 145 which are pressed when the slide bearing 111 is pressed into the crankshaft support hole 110 are secured, so that the assembling workability can be enhanced. Furthermore, the bush 130 of cast iron which has higher rigidity as compared with the crankcase 25 of aluminum alloy is disposed in the crankshaft support hole 110, so that the interference for the press-fit of the slide bearing 111 can be made high, and the slide bearing 111 can be more firmly fixed.

The journal portions 104A, 104B are formed to be larger in diameter than the joint portions 105A, 105B located at both the sides of the journal portions 104A, 104B, and the super finishing work for the surfaces of the journal portions 104A, 104B is performed before the assembly type crankshaft 41 is assembled. Therefore, it is unnecessary to perform the super finishing work on the assembled crankshaft 41 which is relatively large, so that the facilities for the super finishing work can be miniaturized and the productivity can be enhanced.

Furthermore, the inner peripheral surface 131 of the bush 130 is designed in a flat shape having no groove, and the center portion in the width direction of the outer periphery is configured as the ring-shaped diameter-increased portion 132A, so that the rigidity of the bush 130 can be enhanced and the thermal expansion of the bush 130 can be made uniform. Therefore, the joint strength of the bush 130 to the crankcase 25 can be enhanced. Furthermore, the joint strength to the crankcase 25 can be enhanced by the whirl-stop portions 132B.

One oil introduced to the big end portion 42A passes through the shaft end side support portion 108 to the in-shaft oil path 113 separately from the other oil introduced from the holding wall 23A side of the crankcase 25 to the slide bearing 111. Therefore, the oil supply amount of the in-shaft oil path 113 can be reduced to the oil supply amount optimum to the roller bearing 112 of the big end portion 42A. Accordingly, the roller bearing 112 of the big end portion 42A can be prevented from being excessively supplied with oil, and friction can be reduced.

Furthermore, the in-shaft oil path 113 in which one oil supplied from the oil pump 86 to the crankshaft 41 flows is a passage to which the upper oil path 95A to the valve driving system at the valve driving chamber 53 side is branched by providing the small hole 96A. Therefore, the oil supply amount to the big end portion 42A side can be reduced by a simple construction with securing the oil supply amount to the driving system and the slide bearing 111 in which the other oil flows. Furthermore, the oil pump 86 can be miniaturized because the oil supply amount can be reduced.

Furthermore, the in-shaft oil path 113 in which one oil supplied from the oil pump 86 to the crankshaft 41 flows is a passage to which the upper oil path 95A to the valve driving system at the valve driving chamber 53 side is branched by providing the small hole 96A. Therefore, the oil supply amount to the big end portion 42A side can be reduced by a simple construction with securing the oil supply amount to the driving system and the slide bearing 111 in which the other oil flows. Furthermore, the oil pump 86 can be miniaturized because the oil supply amount can be reduced. Furthermore, the oil supply to the slide bearing 111 is performed through the bush oil path 135 which is formed in the radial direction coaxially with the journal oil paths 99, 99 in the bush 130. Therefore, the work of matching the journal oil paths 99, 99 and the bush oil path 135 coaxially with each other can be eliminated, and thus the productivity can be enhanced. Still furthermore, the bush 130 is supported by the bush support portion 137 which is larger in width than the side surface plate portion 120 and has the thickness t1 which is not less than the thickness t2 in the radial direction of the bush 130. Therefore, the bush 130 can be stably supported, and the thermal effect and the distortion effect which the bush 130 suffers from the side surface plate portion 120 can be dispersed and moderated. Still furthermore, when the thrust receiving face 147 formed at the side portion of the large-width cover portion 128B at the con-rod 42 side is lubricated by oil leaking out from the slide bearings 111, the amount of oil leaking to the outside can be restricted by the oil pool wall 139 of the large-width cover portion 128A at the con-rod counter side. Therefore, the oil amount can be set to a proper value and the thrust receiving face 147 can be efficiently lubricated.

The foregoing embodiment is a mode to which the present invention is applied, and the present invention is not limited to the foregoing embodiment.

In the above embodiment, the slide bearing 111 is constructed by a pair of bisected halved bodies 140, 140. However, the present invention is not limited to this style. For example, the slide bearing may be an integrally formed tubular member. Furthermore, it is needless to say that any modification may be also made to the other particulars of the two-wheeled motor vehicle 1.

DESCRIPTION OF REFERENCE NUMERALS 23A holding wall (support member)
25 crankcase
41 crankshaft
42A big end portion (con-rod big end)
86 oil pump
95A upper oil path (oil supply passage to valve driving system)
96A small hole (diaphragm portion)

99, 99 journal oil path (path in crankcase)
103 crankpin (crankpin portion)
104A, 104B journal portion (bearing portion)
108 shaft end side support portion (crankshaft end)
110 crankshaft support hole (bearing press-fit hole)
111 slide bearing (crank bearing)
112 roller bearing (rolling bearing)
113 in-shaft oil path (oil path penetrating through the shaft)
120 side surface plate portion (peripheral wall)
128A, 128B large-width cover portion
130 bush
131 inner peripheral surface (inner periphery)
132 outer peripheral surface (outer periphery)
132A diameter-increased portion
132B whirl-stop portion
133A, 133B both side surface portions (both side surfaces of bush)
135 bush oil path (through-hole in radial direction)
137 bush support portion
139 oil pool wall
145 split face
146A, 146B side surface (both side surfaces in axis direction of slide bearing)
147 thrust receiving face (thrust receiver)
G axis line (crank axis line)

The invention claimed is:

1. A support structure for a crankshaft of an internal combustion engine supported by right-left split crankcases that are joined from both sides in an axial direction of a crankshaft so as to sandwich the crankshaft therebetween, characterized in that both crank bearings for supporting both ends of the crankshaft comprise slide bearings, and a bearing for a con-rod big end comprises a roller bearing the slide bearings are bisectionally constructed, split faces passing through a crank axis line and both side surfaces in an axial direction of the slide bearing are configured to be flat, a bush having a higher rigidity than material of the crankcase is disposed in a bearing press-fit hole of the crankcase wherein an oil pump is disposed to be shifted to one side in the axial direction of the crankshaft, oil is introduced from the oil pump through a crankshaft end to the con-rod big end by a first oil path penetrating through the shaft, and oil is introduced from support member sides of the crankcases to the slide bearings by a second oil path.

2. The support structure for the crankshaft of the internal combustion engine according to claim 1, wherein the crankshaft is an assembling type crankshaft in which both end portions thereof are manufactured while separated from a crankpin portion, bearing portions at both the ends of the crankshaft that are supported by the slide bearings are formed to be larger in diameter than both the sides thereof, and super finishing is conducted on surfaces of the bearing portions before the crankshaft is assembled.

3. The support structure for the crankshaft of the internal combustion engine according to claim 1, wherein the bush is configured to have a flat inner periphery with no groove, a center portion in a width direction of an outer periphery of the bush is configured as a ring-shaped diameter-increased portion, and whirl-stop portions that are discontinuous in a peripheral direction are provided to both side portions of the bush.

4. The support structure for the crankshaft of the internal combustion engine according to claim 1, wherein the first oil path is a path which is branched from an oil supply path to a valve driving system by providing a diaphragm portion.

5. The support structure for the crankshaft of the internal combustion engine according to claim 3, wherein oil supply to the slide bearing is performed through a second oil path that is formed by through-hole in a radial direction that is formed in the bush so as to be coaxial with paths in the crankcase.

6. The crankshaft support structure of the internal combustion engine according to claim 5, wherein a holding wall of the crankcase for hooding the bush has large-width covering portions for covering both side surface portions of the bush, and a bush support portion that is larger in width than a peripheral wall of the crankcase and smaller in width than the large-width cover portions at an outer peripheral surface side of the bush, and the bush support portion is configured to have a thickness that is not less than the thickness of the bush.

7. The support structure for the crankshaft of the internal combustion engine according to claim 6, wherein an oil pool wall is formed at a side portion at a con-rod counter side of the large-width cover portions by further extending a cover portion for covering a side surface of the bush to the inner peripheral side, and a thrust receiver of the crankshaft is formed at a side portion at the con-rod side of the large-width cover portions.

8. A support structure for a crankshaft of an internal combustion engine comprising right-left split crankcases joined from both sides in an axial direction of a crankshaft so as to sandwich the crankshaft therebetween, characterized in that both crank bearings for supporting both ends of the crankshaft comprise slide bearings, and a bearing for a con-rod big end comprises a roller bearing the slide bearings are bisectionally constructed, split faces and both side surfaces in an axial direction of the slide bearing are configured to be flat, a bush having a higher rigidity than material of the crankcase is disposed in a bearing press-fit hole of the crankcase, and the bush has a width larger than the slide bearing, wherein an oil pump is disposed to be shifted to one side in the axial direction of the crankshaft, and oil is introduced from the oil pump through a crankshaft end to the con-rod big end by a first oil path which is branched from an oil supply path to a valve driving system by providing a diaphragm portion, and oil is introduced from support member sides of the crankcases to the slide bearings by a second oil path through a through-hole in a radial direction that is formed in the bush to be coaxial with paths in the crankcase.

9. A support structure for a crankshaft of an internal combustion engine comprising right-left split crankcases joined from both sides in an axial direction of a crankshaft so as to sandwich the crankshaft therebetween, characterized in that both crank bearings for supporting both ends of the crankshaft comprise slide bearings, and a bearing for a con-rod big end comprises a roller bearing, the slide bearings are bisectionally constructed, split faces passing through a crank axis line, and both side surfaces in an axial direction of the slide bearing are configured to be flat, a bush having a higher rigidity than material of the crankcase is disposed in a bearing press-fit hole of the crankcase, and the bush has a width larger than the slide bearing, an oil pump is disposed to be shifted to one side in the axial direction of the crankshaft, oil is introduced from the oil pump through a crankshaft end to the con-rod big end by a first oil path penetrating through the shaft, and oil is introduced from support member sides of the crankcases to the slide bearings by a second oil path.

10. The support structure for the crankshaft of the internal combustion engine according to claim 9, wherein the crankshaft is an assembling type crankshaft in which both end portions thereof are manufactured while separated from a crankpin portion, bearing portions at both ends of the crankshaft that are supported by the slide bearings are formed to be larger in diameter than both the sides thereof, and super finishing is conducted on surfaces of the bearing portions before the crankshaft is assembled.

11. The support structure for the crankshaft of the internal combustion engine according to claim 9, wherein the bush is configured to have a flat inner periphery with no groove, a center potion in a width direction of an outer periphery of the bush is configured as a ring-shaped diameter-increased portion, and whirl-stop portions that are discontinuous in a peripheral direction are provided to both side portions of the bush.

12. The support structure for the crankshaft of the internal combustion engine according to claim 9, wherein the first oil path is a path which is branched from an oil path to a valve driving system by providing a diaphragm portion.

13. The support structure for the crankshaft of the internal combustion engine according to claim 11, wherein oil supply to the slide bearing is performed through a second oil path that is formed by through-hole in a radial direction that is formed in the bush so as to be coaxial with paths in the crankcase.

14. The support structure for the crankshaft of the internal combustion engine according to claim 13, wherein a holding wall of the crankcase for hooding the bush has large width covering portions for covering both side surface portions of the bush, and a bush support portion that is larger in width than a peripheral wall of the crankcase and smaller in width than the large-width cover portions at an outer peripheral surface side of the bush, and the bush support portion is configured to have a thickness that is not less than the thickness of the bush.

15. The support structure for the crankshaft of the internal combustion engine according to claim 14, wherein an oil pool wall is formed at a side portion at a con-rod counter of the large-width cover portions by further extending a cover portion for covering a side surface of the bush to the inner peripheral side, and a thrust receiver of the crankshaft is formed at a side portion at the con-rod side of the large-width cover portions.

* * * * *